(12) United States Patent
Su et al.

(10) Patent No.: US 10,845,382 B2
(45) Date of Patent: Nov. 24, 2020

(54) INFRARED CHARACTERIZATION OF A SAMPLE USING OSCILLATING MODE

(71) Applicants: Bruker Nano, Inc., Santa Barbara, CA (US); Lehigh University, Bethlehem, PA (US)

(72) Inventors: Chanmin Su, Ventura, CA (US); Martin Wagner, Goleta, CA (US); Xiaoji Xu, Bethlehem, PA (US)

( * ) Notice: Subject to any disclaimer, the term of this patent is extended or adjusted under 35 U.S.C. 154(b) by 0 days.

(21) Appl. No.: 15/683,577

(22) Filed: Aug. 22, 2017

(65) Prior Publication Data

US 2018/0052186 A1 Feb. 22, 2018

Related U.S. Application Data

(60) Provisional application No. 62/506,962, filed on May 16, 2017, provisional application No. 62/378,107, filed on Aug. 22, 2016.

(51) Int. Cl.
*G01Q 30/02* (2010.01)
*G01Q 60/34* (2010.01)
*G01N 21/35* (2014.01)

(52) U.S. Cl.
CPC .......... *G01Q 30/02* (2013.01); *G01N 21/35* (2013.01); *G01Q 60/34* (2013.01)

(58) Field of Classification Search
None
See application file for complete search history.

(56) References Cited

U.S. PATENT DOCUMENTS

| | | |
|---|---|---|
| 5,060,248 A | 10/1991 | Dumoulin |
| 5,229,606 A | 7/1993 | Elings et al. |
| 5,266,801 A | 11/1993 | Elings et al. |
| 5,267,471 A | 12/1993 | Abraham et al. |
| 5,406,832 A | 4/1995 | Gamble et al. |
| 5,412,980 A | 5/1995 | Elings et al. |
| 5,415,027 A | 5/1995 | Elings et al. |
| 5,507,179 A | 4/1996 | Gamble et al. |
| 5,513,518 A | 5/1996 | Lindsay |

(Continued)

FOREIGN PATENT DOCUMENTS

| | | |
|---|---|---|
| CN | 1253291 | 5/2000 |
| CN | 2591559 | 12/2003 |

(Continued)

OTHER PUBLICATIONS

Kwak et al, "Imaging stretched single DNA molecules by pulsed-force-mode atomic force microscopy", Scient Direct (www.sciencedirect.com), DOI: 10.1016/S0304-3991(03)00049-4, (2003), pp. 249-255.

(Continued)

*Primary Examiner* — Andrew Smyth
(74) *Attorney, Agent, or Firm* — Boyle Fredrickson S.C.

(57) ABSTRACT

An apparatus and method of performing sample characterization with an AFM and a pulsed IR laser directed at the tip of a probe of the AFM. The laser pulses are synchronized with the oscillatory drive of the AFM and may only interact with the tip/sample on selected cycles of the oscillation. Peak force tapping mode is preferred for AFM operation. Nano-mechanical and nano-spectroscopic measurements can be made with sub-50 nm, and even sub-20 nm, resolution.

16 Claims, 20 Drawing Sheets

(56) References Cited

U.S. PATENT DOCUMENTS

| | | | |
|---|---|---|---|
| 5,519,212 A | 5/1996 | Elings et al. | |
| 5,955,660 A | 9/1999 | Honma | |
| 6,005,246 A | 12/1999 | Kitamura et al. | |
| 6,008,489 A | 12/1999 | Elings et al. | |
| RE36,488 E | 1/2000 | Elings et al. | |
| 6,134,955 A | 10/2000 | Han et al. | |
| 6,441,371 B1 | 8/2002 | Ahn et al. | |
| 6,519,221 B1 | 2/2003 | Manalis et al. | |
| 6,608,307 B1 | 8/2003 | Baur | |
| 6,690,008 B2 | 2/2004 | Hantschel et al. | |
| 6,880,386 B1 | 4/2005 | Krotil et al. | |
| 6,894,272 B2 | 5/2005 | Kranz et al. | |
| 6,906,450 B2 | 6/2005 | Tamyo De Miguel et al. | |
| 6,935,167 B1 | 8/2005 | Sahin et al. | |
| 7,044,007 B2 | 5/2006 | Struckmeier et al. | |
| 7,074,340 B2 | 7/2006 | Lugstein et al. | |
| 7,129,486 B2 | 10/2006 | Spizig et al. | |
| 7,156,965 B1 | 1/2007 | Li et al. | |
| 7,249,002 B1 | 7/2007 | Ben-Dov et al. | |
| 7,395,698 B2 | 7/2008 | Degertekin | |
| 7,441,447 B2 | 10/2008 | Degertekin et al. | |
| 7,448,798 B1 | 11/2008 | Wang | |
| 7,461,543 B2 | 12/2008 | Degertekin | |
| 7,464,583 B1 | 12/2008 | Kowalewski et al. | |
| 7,478,552 B2 | 1/2009 | Gotthard et al. | |
| 7,550,963 B1 | 6/2009 | Xiang et al. | |
| 7,552,625 B2 | 6/2009 | Degertekin | |
| 7,596,989 B2 | 10/2009 | Humphris et al. | |
| 7,617,719 B2 | 11/2009 | Su et al. | |
| 7,637,149 B2 | 12/2009 | Degertekin et al. | |
| 7,665,350 B2 | 2/2010 | Giessibl | |
| 7,707,873 B2 | 5/2010 | Degertekin | |
| 7,810,166 B2 | 10/2010 | Struckmeier et al. | |
| 8,220,318 B2 | 7/2012 | Degertekin | |
| 8,646,109 B2* | 2/2014 | Hu | G01Q 10/065 850/1 |
| 8,650,660 B2 | 2/2014 | Shi et al. | |
| 8,739,311 B2 | 5/2014 | Wickramasinghe et al. | |
| 8,955,161 B2 | 2/2015 | Andreev | |
| 9,207,167 B2 | 12/2015 | Andreev | |
| 9,719,916 B2 | 8/2017 | Andreev et al. | |
| 2002/0096642 A1 | 7/2002 | Massie | |
| 2002/0174714 A1 | 11/2002 | McWaid | |
| 2004/0134264 A1 | 7/2004 | Massie | |
| 2004/0134265 A1 | 7/2004 | Mancevski | |
| 2005/0030054 A1 | 2/2005 | Chang | |
| 2005/0212529 A1 | 9/2005 | Huang et al. | |
| 2005/0266586 A1 | 12/2005 | Linder et al. | |
| 2006/0005634 A1 | 3/2006 | Schroeder et al. | |
| 2006/0219905 A1 | 10/2006 | Gibson et al. | |
| 2006/0260388 A1 | 11/2006 | Su et al. | |
| 2006/0283338 A1 | 12/2006 | Degertekin | |
| 2007/0012094 A1 | 1/2007 | Degertekin et al. | |
| 2007/0024295 A1 | 2/2007 | Humphris et al. | |
| 2007/0082459 A1 | 4/2007 | Faris | |
| 2007/0084273 A1 | 4/2007 | Hare et al. | |
| 2007/0089496 A1 | 4/2007 | Degertekin | |
| 2007/0103697 A1 | 5/2007 | Degertekin | |
| 2007/0107502 A1 | 5/2007 | Degertekin | |
| 2007/0220958 A1 | 9/2007 | Gotthard | |
| 2007/0295064 A1 | 12/2007 | Degertekin et al. | |
| 2008/0022759 A1 | 1/2008 | Su et al. | |
| 2008/0127722 A1 | 6/2008 | Su et al. | |
| 2008/0277582 A1 | 11/2008 | Shi et al. | |
| 2008/0295583 A1 | 12/2008 | Giessibl | |
| 2008/0295584 A1* | 12/2008 | Cantrell | G01Q 60/32 73/105 |
| 2008/0307865 A1 | 12/2008 | Degertekin | |
| 2009/0032706 A1 | 2/2009 | Prater et al. | |
| 2010/0039919 A1 | 2/2010 | Chou et al. | |
| 2010/0045970 A1 | 2/2010 | Raschke | |
| 2011/0170108 A1 | 7/2011 | Degertekin | |
| 2012/0050718 A1* | 3/2012 | Dazzi | G01Q 30/02 356/51 |
| 2012/0204296 A1* | 8/2012 | Prater | B82Y 35/00 850/6 |
| 2013/0205454 A1 | 8/2013 | Baba et al. | |
| 2014/0289912 A1* | 9/2014 | Andreev | G01Q 30/20 850/18 |
| 2015/0198630 A1 | 7/2015 | Shi et al. | |
| 2015/0308947 A1 | 10/2015 | Xu et al. | |
| 2016/0154022 A1 | 6/2016 | Humphris | |
| 2016/0209322 A1 | 7/2016 | Andreev | |

FOREIGN PATENT DOCUMENTS

| | | |
|---|---|---|
| JP | H04254930 A | 9/1992 |
| JP | H11-133038 | 5/1999 |
| JP | H11160333 A | 6/1999 |
| JP | H11183414 A | 7/1999 |
| JP | H11-352135 | 12/1999 |
| JP | 2001108601 | 4/2001 |
| JP | 3229329 | 11/2001 |
| JP | 3536973 | 6/2004 |
| JP | 2004170281 | 6/2004 |
| JP | 2005-512100 | 4/2005 |
| JP | 4452278 | 4/2010 |
| JP | 2010071871 A | 4/2010 |
| JP | 2016023952 A | 2/2016 |
| KR | 20040106699 | 12/2004 |
| WO | 2002048644 | 6/2002 |
| WO | 2010032429 | 3/2010 |
| WO | 2010/065131 | 6/2010 |

OTHER PUBLICATIONS

Kruger et al, "Scanning Force Microscopy Based Rapid Force Curve Acquisition on Supported Lipid Bilayers: Experiments and Simulations Using Pulsed Force Mode", ChemPhysChem (www.chemphyschem.org), DOI: 10.1002/cphc.200301059, (2004), pp. 989-997.

Kresz et al, "Investigation of pulsed laser deposited crystalline PTFE thin layer with pulsed force mode AFM", Science Direct (www.sciencedirect.com), DOI: 10.1016/j.tsf.2003.11.254, (2003), pp. 239-244.

Shanmugham et al, "Polymer Nanowire Elastic Moduli Measured with Digital Pulsed Force Mode AFM", American Chemical Society, DOI: 10.1021/la050538o, Jun. 11, 2005, pp. 10214-10218.

Zhang et al, "Pulsed-Force-Mode AFM Studies of Polyphenylene Dendrimers on Self-Assembled Monolayers", The Journal of Physical Chemistry, DOI: 10.1021/jp073388u, May 23, 2007, pp. 8142-8144.

Jradi et al, "Analysis of photopolymerized acrylic films by AFM in pulsed force mode", Journal of Microscopy, vol. 229, Pt 1 2008, pp. 151-161.

Miyatani et al, "Mapping of electrical double-layer force between tip and sample surfaces in water with pulsed-force-mode atomic force microscopy", American Institute of Physics (http://apl.aip.org/apl/copyright.jsp), vol. 71, No. 18, Nov. 3, 1997, pp. 2632-2634.

Moreno-Herrero et al, "Characterization by Atomic Force Microscopy of Alzheimer Paired Helical Filaments under Physiological Conditions", Biophysical Journal, vol. 86, Jan. 2004, pp. 517-525.

Sotres et al, "Jumping mode AFM Imaging of biomolecules in the repulsive electrical double layer", Science Direct (www.sciencedirect.com). DOI: 10.1016/j.ultramic.2001.01.020, Jan. 31, 2007, pp. 1207-1212.

Kwak et al, "Topographic effects on adhesive force mapping of stretched DNA molecules by pulsed-force-mode atomic force microscopy", Science Direct (www.sciencedirect.com), DOI: 10.1016/j.ultramic.2003.11.005, Nov. 24, 2003, pp. 179-186.

Moreno-Herrero et al, "DNA height in scanning force microscopy", Science Direct (www.sciencedirect.com), DOI: 10.1016/S0304-3991(03)00004-4, Nov. 22, 2002, pp. 167-174.

Moreno-Herrero et al, "Jumping mode atomic force microscopy obtains reproducible images of Alzheimer paired helical filaments in liquids", Science Direct (www.sciencedirect.com), DOI: 10.1016/j.eurpolymj.2004.01.018, Jan. 20, 2004, pp. 927-932.

(56) References Cited

OTHER PUBLICATIONS

Moreno-Herrero et al, "Atomic force microscopy contact, tapping, and jumping modes for imaging biological samples in liquids", The American Physical Society, Physical Review E 69, 031915, 2004, pp. 031915-1-031915-9.

Jiao et al, "Accurate Height and Volume Measurements on Soft Samples with the Atomic Force Microscope", American Chemical Society, DOI: 10.1021/la048650u, Oct. 8, 2004, pp. 10038-10045.

Ven Der Werf et al, "Adhesion force imaging in air and liquid by adhesion mode atomic force microscopy", American Institute of Physics, Appl. Phys. Lett. 65 (9), Aug. 29, 1994, pp. 1195-1197.

Krotil et al, "Pulsed Force Mode: a New Method for the Investigation of Surface Properties", Surface and Interface Analysis, vol. 27, 1999, pp. 336-340.

Miyatani et al, "Surface charge mapping of solid surfaces in water by pulsed-force-mode atomic force microscopy", Applied Physics A Materials Science & Processing, vol. A 66, 1998, pp. S349-S352.

Maivaldt et al, "Using force modulation to image surface elasticities with the atomic force microscope", Nanotechnology 2, Feb. 20, 1991, pp. 103-106.

Marti et al, "Control electronics for atomic force microscopy", American Institute of Physics, v. Bal Instrum 69 (8), Jun. 1988, No. 6, pp. 836-839.

Sarid et al, "Driven nonlinear atomic force microscopy cantilevers: From noncontact to tapping modes of operation", American Vacuum Society, J. Vac. Sci. Technol. B 14(2), Mar./Apr. 1996, pp. 864-867.

Dr. Profos et al, "Handbuch der industriellen Messtechnik", R. Oldenbourg Verlag Munchen Wien, Feb. 11, 1992, pp. 203-206.

Marti et al, "Reibungsmikroskopie", Aus der Wissenshaft, Phys. Bl. 48 Nr. 12, 1992, pp. 1007-1009.

Rosa et al, "The simultaneous measurement of elastic, electrostatic and adhesive properties by scanning force microscopy: pulsed-force mode operation", Department of Experimental Physics, University of Ulm, Jul. 29, 1997, pp. 1-6.

Radmacher et al, "Imaging Adhesion Forces and Elasticity of Lysozyme Adsorbed on Mica with the Atomic Force Microscope", American Chemical Society, Jul. 11, 1994, pp. 3809-3814.

Spatz et al, "Forces affecting the substrate in resonant tapping force microscopy", University of Ulm, May 23, 1995, pp. 40-44.

Radmacher et al, "Mapping Interaction Forces with the Atomic Force Microscope", Department of Physics, University of California, Mar. 7, 1994, pp. 2159-2165.

Martin et al, "Atomic force microscope-force mapping and profiling on a sub 100-A scale", American Institute of Physics, J. Appl. Phys. 61 (10), May 15, 1987, pp. 4723-4729.

Mizes et al, "Submicron probe of polymer adhesion with atomic force microscopy: Dependence on topography and material inhomogeneities", American Institute of Physics, Appl. Phys. Lett. 59 (22), Nov. 25, 1991, pp. 2901-2903.

Jacobs et al., "Practical Aspects of Kelvin Probe Force Microscopy", Review of Scientific Instruments, AIP, Melville, NY, vol. 70, No. 3, Mar. 1, 1999, pp. 1756-1760.

Gannepalli et al., "Thermal Noise Response Based Control of Tip-Sample Separation in AFM", American Control Conference, 2004, Boston, MA Jun. 30, 2004, pp. 3122-3127.

Jacobs et al., "Surface Potential Mapping: A Qualitative Material Contrast in SPM", Ultramicroscopy, vol. 69, No. 1, Aug. 1, 1997, pp. 39-49.

Devecchio et al., "Use of a Nanoscale Kelvin Probe for Detecting Wear Precursors", Review of Scientific Instruments, vol. 69, No. 10, Oct. 1, 1998, pp. 3618-3624.

Jahng et al., "Linear and Nonlinear Optical Spectroscopy at the Nanoscale with Photoinduced Force Microscopy", Accounts of Chemical Research, Jul. 10, 2015.

Anderson, "Infrared Spectroscopy with an Atomic Force Microscope", Applied Spectroscopy, vol. 54, No. 3, 2000, pp. 349-352.

* cited by examiner

FIG. 4A  IR pulsed   IR un-pulsed
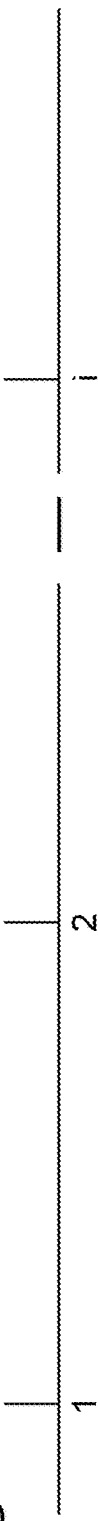
FIG. 4B
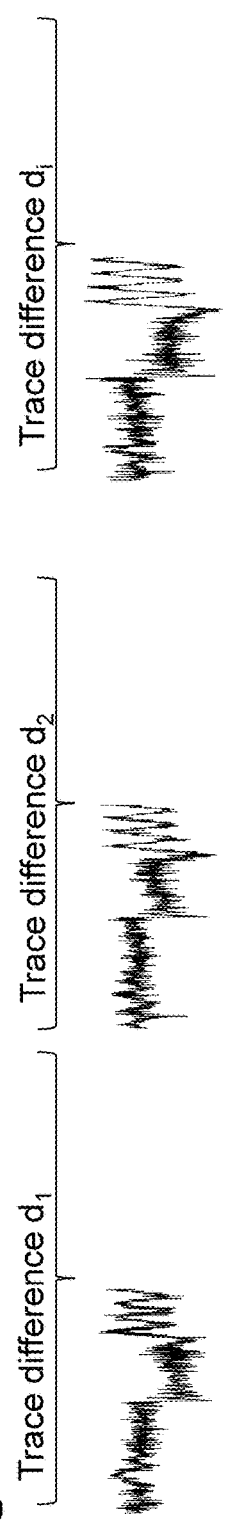
FIG. 4C
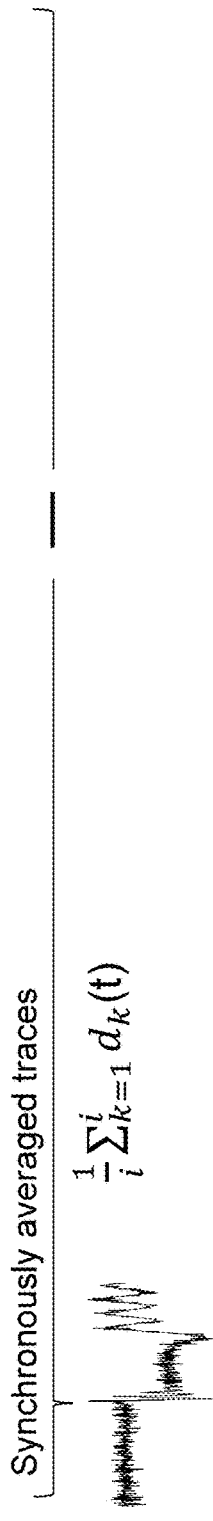
FIG. 4D

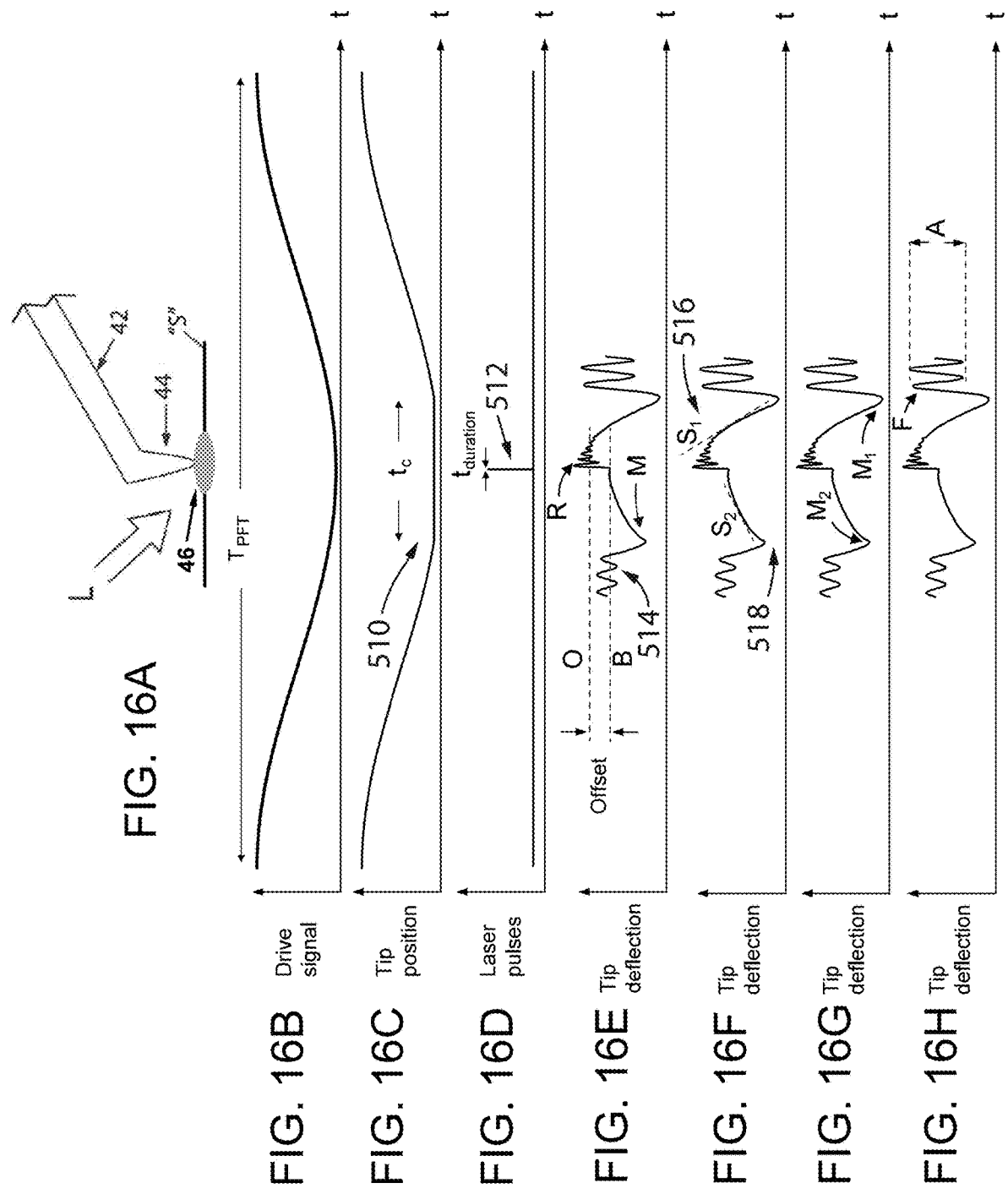

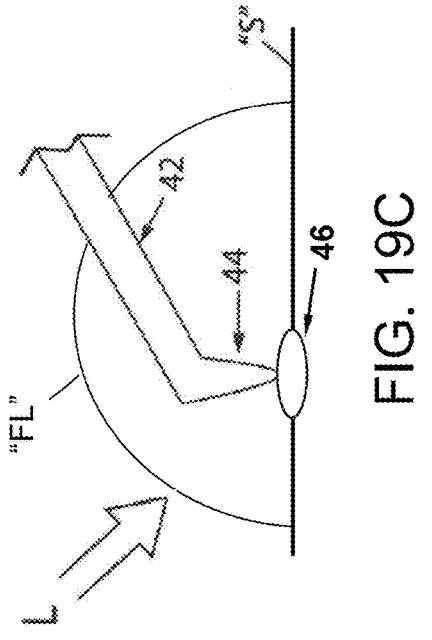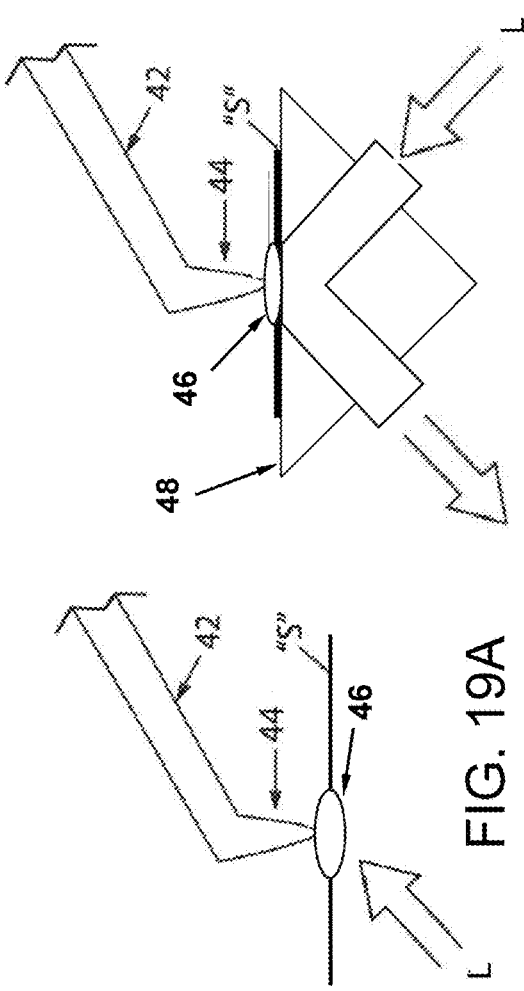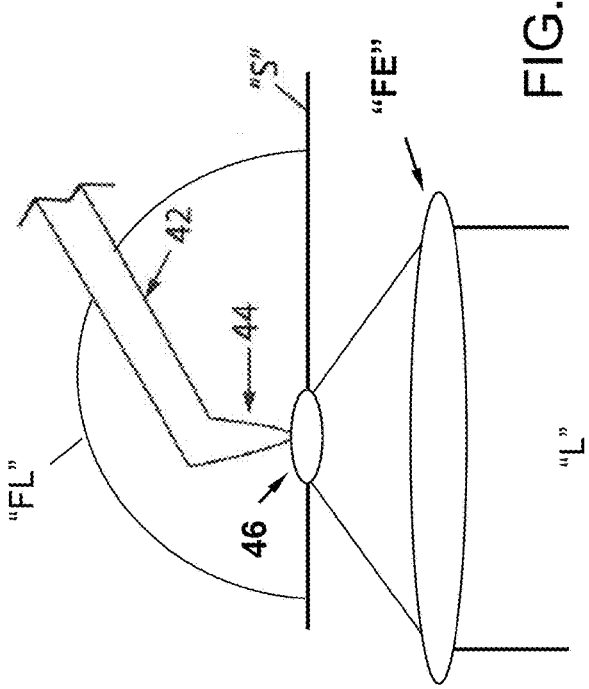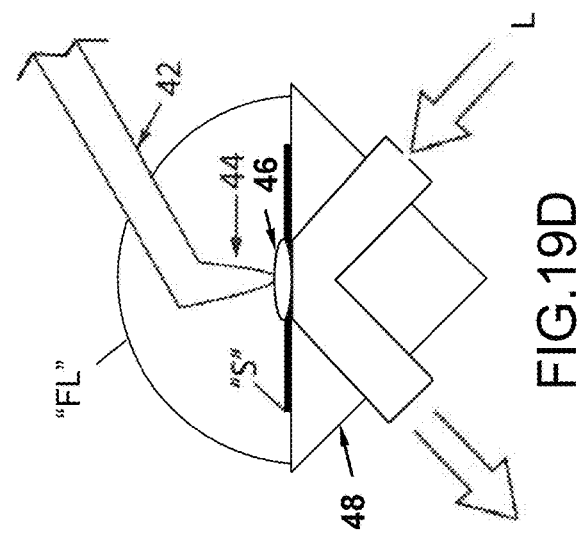

INFRARED CHARACTERIZATION OF A SAMPLE USING OSCILLATING MODE

CROSS-REFERENCE TO RELATED APPLICATIONS

This application claims benefit under 35 USC § 119(e) to U.S. Provisional Patent Application Ser. No. 62/378,107, filed on Aug. 22, 2016, entitled Peak Force Infrared Sample Characterization and U.S. Provisional Patent Application Ser. No. 62/506,962 filed on May 16, 2017, entitled Oscillating Mode Infrared Sample Characterization. The subject matter of these applications is hereby incorporated by reference in its entirety.

BACKGROUND OF THE INVENTION

Field of the Invention

The preferred embodiments are directed to making nanomechanical and spectroscopy measurements, and more particularly, using peak force tapping (PFT) as the oscillating mode of AFM operation and IR electromagnetic excitation for localized spectroscopy on a sample, as well as nanomechanical sample characterization.

Description of Related Art

Infrared spectroscopy and scanning probe microscopy (SPM) have been combined to perform a method of spectroscopy that integrates an infrared light source, e.g., a tunable free electron laser, an optical parametric oscillator or a quantum cascade laser with an atomic force microscope (AFM) having a sharp probe that measures the local absorption of infrared light by a sample. Conventional techniques in this regard are based on contact-mode AFM and extract the absorption signal from contact resonance oscillations that occur when the sample expands (or contracts) during light absorption. Developments have improved the spatial resolution of these photothermal AFM-based techniques from microns to 100 nm. Recently, a tapping mode based AFM technique using IR illumination has been shown to yield a spatial resolution down to 10 nm. Here, the underlying mechanism is claimed to be a photoinduced image force between the AFM probe and the sample.

In general the interaction between a sample under test and electromagnetic energy can be monitored to yield information concerning the sample. In spectroscopy, transmission of light through a sample or its reflection off a sample results in a sample-characteristic plot of transmitted or reflected intensity as a function of wavelength. This spectroscopic information allows users to determine the physical properties of the sample, such as chemical composition or temperature.

Notably, making spectroscopic measurements with a spatial resolution on the nanoscale is continuing to improve. However, despite ongoing progress in the development of imaging techniques with spatial resolution beyond the diffraction limit, simultaneous spectroscopic implementations delivering chemical specificity and sensitivity on the molecular level have remained challenging. Far-field localization techniques can achieve spatial resolution down to about 20 nm by point-spread function reconstruction but typically rely on fluorescence from discrete molecular or quantum dot emitters, with limited chemically specific information.

SPMs are facilitating improvements in this area. AFMs are devices which typically employ a probe having a tip and causing the tip to interact with the surface of a sample with appropriate forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample and a corresponding map of the sample can be generated.

A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, $A_S$, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

AFMs may be designed to operate in a variety of modes, including contact mode and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e. the force resulting from tip/sample interaction. Alternative feedback arrangements keep the phase or oscillation frequency constant. As in contact mode, these feedback signals are then collected, stored, and used as data to characterize the sample. Note that "SPM" and the acronyms for the specific types of SPMs, may be used herein to refer to either the microscope apparatus or the associated technique, e.g., "atomic force microscopy." In a recent improvement on the ubiquitous TappingMode™, called Peak Force Tapping® (PFT) Mode, discussed in U.S. Pat. Nos. 8,739,309, 9,322,842 and 9,588,136, which are expressly incorporated by reference herein, feedback is based on force (also known as a transient probe-sample interaction force) as measured in each oscillation cycle.

Regardless of their mode of operation, AFMs can obtain resolution down to the atomic level on a wide variety of insulating or conductive surfaces in air, liquid, or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

Infrared (IR) spectroscopy is a useful tool in many analytical fields such as polymer science and biology. Conventional IR spectroscopy and microscopy, however, have resolution on the scale of many microns, limited by optical diffraction. It has become apparent that it would be particularly useful to perform IR spectroscopy on a highly localized scale, on the order of biological organelles or smaller, at various points on a sample surface. That way, information about the composition of the sample, such as location of different materials or molecular structures, could be obtained.

Conventional far field infrared (IR) spectroscopy is a widely used technique to measure the characteristics of material. In many cases, the unique signatures of IR spectra can be used to identify unknown material. IR spectroscopy is performed on bulk samples which gives compositional information but not nanoscale structural information since IR spectroscopy allows collection of IR spectra with a limited resolution on the scale of many microns. Far-field localization techniques can achieve spatial resolution down to about 20 nm by point-spread function reconstruction but typically rely on fluorescence from discrete molecular or quantum dot emitters, with limited chemically specific information.

Scattering scanning near-field optical microscopy (s-SNOM) has been applied to some degree in infrared spectroscopy and imaging. In scattering-type SNOM (s-SNOM) external illumination of the sharp (metallic or semi-conducting) AFM probe tip leads to detectable light scattering from the near-field probe-sample interaction region—light scattering that is specific to the material under the tip. In addition to this IR s-SNOM implementation that can for instance be sensitive to vibrational resonances of polymers, tip-enhanced coherent anti-Stokes Raman spectroscopy (CARS), or tip-enhanced Raman scattering (TERS) are chemically sensitive alternative approaches. Here the antenna or plasmon resonances of the (noble) metal tips can provide the necessary field enhancement for even single-molecule sensitivity.

In the standard implementation, however, the direct illumination of the tip apex results in a three-to-four orders of magnitude loss in excitation efficiency, related to the mode mismatch between the diffraction-limited far-field excitation focus and the desired tens of nanometers near-field localization, as determined by the tip apex radius. The resulting loss of sensitivity, together with a large far-field background signal, often limit contrast and may cause imaging artifacts, presenting challenges for the general implementation of a wider range of spectroscopic techniques in s-SNOM.

While there have been some advancements with s-SNOM, the field is still in need of a sensitive and reliable commercial instrument. Near-Field Scanning optical microscopy (NSOM) provides sub-diffraction-limited resolution through the use of tapered fibers or hollow waveguide tips. However, aperture-limited and wavelength-dependent fiber throughput reduces sensitivity, generally making NSOM unsuitable for spectroscopic techniques that have low intrinsic signal levels. Especially in the mid-IR, the fingerprint region of materials, the transmission through typically 50-100 nm apertures is extremely low, making the instrument only usable in the visible and near-IR region. In the end, NSOM provides a challenging solution because the signal size is small and the acquisition scheme is quite complex employing interferometric detection, stable laser sources and efficient background signal suppression. Consequently, it has difficulty in acquiring absorption spectra.

In sum, despite ongoing progress in the development of imaging techniques with spatial resolution beyond the diffraction limit, spectroscopic implementations delivering chemical specificity and sensitivity on the molecular level have remained challenging. We next describe related art that relies on mechanical detection of IR absorption in contrast to optical detection implemented in s-SNOM, NSOM or TERS.

One technique based on use of an AFM to produce such localized spectra is described in a publication entitled "Local Infrared Microspectroscopy with Sub-wavelength Spatial Resolution with an Atomic Force Microscope Tip Used as a Photo-thermal Sensor" (PTIR) Optics Letters, Vo. 30, No. 18, Sep. 5, 2005. The technique is also discussed in U.S. Pat. No. 8,402,819 (The '819 patent). Those skilled in the art will comprehend the details of the technique in the publication but the technique will be described briefly herein for clarity.

Referring to the '819 patent, in PTIR, infrared radiation is incident on a region of a sample. At a wavelength absorbed by the sample, the absorption will typically cause a local increase in temperature and a rapid thermal expansion of the sample. A probe is arranged to interact with the sample and transducer to generate a signal related to the absorbed IR energy in the region under the probe tip. "Interact" means positioning the probe tip close enough to the sample such that a probe response can be detected in response to absorption of IR radiation. For example, the interaction can be contact mode, tapping mode or non-contact mode. An associated detector can be used to read one or more probe responses to the absorbed radiation. The induced probe response may be a probe deflection, a resonant oscillation of the probe, and/or a thermal response of the probe (e.g., temperature change). For probe deflection and/or resonant oscillation of the probe, appropriate detectors can include split segment photodiodes along with any associated amplification and signal conditioning electronics. In the case of a thermal response, the appropriate detector may comprise, for example, a Wheatstone bridge, a current and/or voltage amplifier and/or other associated electronics to sense, amplify, and condition the thermal signal from the probe. The probe response is then measured as a function of the wavelength of incident radiation to create an absorption spectrum. From the spectra, material in the sample can be characterized and/or identified.

As noted in the '819 patent, an AFM set-up used for the published work on IR spectroscopy is shown. The sample is mounted on a ZnSe prism, or prism made from other suitable materials, which does not absorb the radiation of interest. A pulsed IR source, in this case a Free Electron Laser (FEL) beam, is directed into the prism. The prism is made at an angle such that the beam is in Total Internal Reflection in order for the beam to be propagative in the sample and evanescent in the air. Thus, only the sample is significantly exposed to the laser radiation, and the AFM probe is minimally exposed to the beam. The FEL is an IR source that is both variable in wavelength and has a pulsed output. Free Electron Lasers are large expensive apparatus. The probe is placed at a point on the sample by the scanner and is held at an average height by feedback electronics. Both the vertical and lateral deflection signal, as well as the feedback signal, may be monitored.

When the FEL is pulsed, the sample may absorb some of the energy, resulting in a fast thermal expansion of the sample as shown in FIG. 3 of the '819 patent. This has the effect of a quick shock to the cantilever arm, which, if the ability of the cantilever to respond to this shock is slower than the shock, will result in exciting a resonant oscillation in the cantilever. Because the absorbed energy is ideally contained within the sample, this shock is due primarily to rapid sample expansion, as minimal IR energy is absorbed by the cantilever itself. Although the probe is kept in contact with the surface by the feedback electronics, the resonant signal is too fast for the feedback electronics, but can be observed directly from the photodetector. Thus the cantilever rings down while still in contact with the surface, an effect called "contact resonance". The absolute deflection, amplitude, and frequency characteristics of the contact resonance vary with the amount of absorption, as well as other properties, such as the local hardness, of the localized area around the probe tip, for example, by analyzing the ringdown and/or the Fourier transform (FFT) of the ringdown events. Also, depending on the direction of the expansion, vertical resonances, lateral resonances, or both can be excited. By repeating the above process at varying wavelengths of the FEL, an absorption spectra on a localized scale is achieved. By scanning the probe to various points on the sample surface and repeating the spectra measurement, a map of IR spectral surface characteristics can be made. Alternatively, the wavelength of the FEL can be fixed at a wavelength that is characteristic of absorption of one of the components of the sample. The probe can then be scanned across the sample surface and a map of the location of that component can be generated.

As further noted in the '819 patent, the apparatus described in the literature suffers from limitations. The apparatus employs a bottoms-up illumination scheme that requires a sample to be placed on a specially fabricated IR transmitting prism. In addition to being costly and easy to damage, this arrangement requires special sample preparation techniques to prepare a sample thin enough such that the IR light can penetrate the sample to reach the probe. Further, the actual signals generated can be small, thus requiring averaging of the signal and limiting the bandwidth of the technique. More sensitivity is required to address a wider range of potential samples. Recently, the technique has been extended to allow for top-illumination not requiring a prism. However, signal levels are still small and challenging to detect while the spatial resolution remains larger than 50-100 nm.

The '819 patent contends that the system disclosed therein can be used to obtain IR spectra from highly localized regions of a sample, allowing discrimination and/or identification of the composition of a micro or nano-sized region of a sample. The patent also notes that the system may be used for mapping variations in IR absorption over a wider area of a sample, by imaging the energy absorbed at one or more wavelengths. One additional problem, however, is leakage of heat from a region that actually is absorbing the excitation energy, to a region that is not. When using PTIR, as the sample is heated (i.e., a region of interest exhibits absorbing characteristics), the heat may, and often does, leak toward surrounding regions of the sample. If the probe scans a location that is indirectly heated, the instrument may identify that location as being responsive to the IR excitation and conclude it is absorbing, when in fact it was not. Clearly, this can lead to compromised data and/or poor resolution. In practice, spatial resolution is in the range of 100 nm for the described contact resonance based system. Some publications claim sub-100 nm is achievable with this technique but that is most likely with samples of certain characteristics, e.g., a thin sample having good thermal conductivity. Using a pulsed laser, the tip is always on part of the sample and the measurement is limited by the thermal gradient. In sum, independent of its ability to provide localized spectroscopy, an improved IR microscopy instrument that can provide efficient localized spectroscopic measurements was desired.

Resonance enhanced PTIR is a recent method that provides improved signal levels and spatial resolution, as described in U.S. Pat. No. 8,869,602 and in publication Lu et al. "Tip-enhanced infrared nanospectroscopy via molecular expansion force detection" Nature Photonics 8, 307 (2014). Improved sensitivity and spatial resolution are arguably achieved using field-enhancement at the AFM tip (as also present in s-SNOM or TERS) together with resonant excitation of a cantilever mode, e.g., a bending mode or a contact resonance mode. The latter was purportedly achieved with an IR laser that was pulsing at the same frequency as the $2^{nd}$ cantilever bending mode while the AFM was operated in contact mode and photoexpansion was detected. A spatial resolution of 25 nm was observed, although only on ~2 nm thin films. In addition, the films were deposited on an Au substrate, resulting in significant field enhancement in the substrate-tip cavity that is occupied by the sample. This scheme apparently requires substrate enhancement and hence limits its applicability to thin films that can be deposited on those substrates. Furthermore, AFM contact mode has severe drawbacks compared to intermittent contact (e.g., tapping) mode or peak force tapping mode in the form of tip/sample contamination, tip or sample wear and poor performance on soft, sticky or loose samples. Especially tip contamination or tip wear may present a severe drawback here since any change in the tip geometry or surface influences the field distribution and field-enhancement at the apex. On the laser source side it requires a widely tunable laser with a repetition rate that needs to be adjusted to the respective cantilever resonance. Up to now this is only possible in the 5-10 um wavelength range where QCL lasers with adjustable repetition rate exist, but not in the other part of the mid-IR fingerprint region of primary interest covering ~2-5 um.

Another recently developed technique is photo-induced force microscopy (PiFM), described in U.S. Pat. No. 8,739,311. Here, AFM is operated in tapping mode on one mechanical resonance of the cantilever (typically in the 500-1500 kHz range) while PiFM detection is performed at a different cantilever mode with the IR laser tuned to the difference-frequency. Like PTIR, PiFM detects a mechanical motion, but instead of photoexpansion as in PTIR, PiFM claims to be driven by the photo-induced dipole-dipole force between tip and sample. High sensitivity and spatial resolution down to 10 nm is claimed to have been observed. Currently, the requirement to match the laser frequency to the difference frequency of certain cantilever modes limits the IR source to QCL lasers as in the case of above resonance enhanced PTIR. Also, the cantilever modes may shift in frequency depending on the material under the tip, thus requiring a tracking mechanism for the frequency shift that adjusts the laser frequency accordingly. Importantly, PiFM relies on resonant tapping in contrast to our Peak Force Tapping® mode based method of the current invention, where the probe oscillation occurs far below (at least 10×) the cantilever resonance.

In another technique, known as Peak ForceIR and described in U.S. Pat. No. 8,955,161, which is expressly incorporated by reference herein, Peak Force Tapping® mode AFM is combined with directing light overhead of the sample and locally exciting the photothermal response at the tip-sample interface. Resolution is improved and sample preparation is minimized. The method identifies a change in modulus based on the directing step to provide an indicator of IR absorption by the sample. Measuring techniques sensitive to modulus change, such as peak force tapping (PFT) AFM mode, or contact resonance mode, may be employed.

Thus, reliable mid-infrared spectroscopic imaging with sub-20 nm spatial resolution has been currently a challenge for the scientific community. Popular fluorescence-based super-resolution microscopy techniques are not applicable to the mid infrared range. And scattering-type near-field techniques, such as infrared scattering-type scanning near-field optical microscopy (s-SNOM), require a high level of instrument complexity and sophisticated signal extraction methods to obtain the resonant profiles. Besides, when measuring soft materials such as polymers, s-SNOM signals are weak, therefore limiting its applications.

Complimentary to s-SNOM, action-based infrared spectroscopy, such as the AFM-IR based on photothermal induced resonance, allows simple instrumentation and straightforward interpretation of the resonance profiles. However, the spatial resolution of this contact mode based technique is about 100 nm, too large for detailed nanoscale characterization. Resonance enhanced PTIR with higher spatial resolution appears to require very thin films on metallic substrates for field- and hence signal-enhancement. Photoinduced force microscopy (PiFM) appears to have demonstrated 10 nm resolution. Here, a limitation is the requirement to match the laser repetition rate to the difference-frequency of cantilever modes, which change with the material under the tip and the probe.

Another important point is that none of the existing scanning probe microscopy methods are intrinsically suitable for the correlative multimodal spectroscopy of nanoscale IR spectroscopy and simultaneous mechanical measurements with sub-20 nm nanoscale spatial resolution. Only straightforward combinations of sequential utilizations of s-SNOM and quantitative nano-mechanical mapping have been studied. s-SNOM provides spectroscopic information and peak force tapping provides the mechanical response. However, such operations require switching between two methods of operations, and inherit the high instrument complexity from both methods. In addition, scattering-type near-field techniques require the presence of optical field enhancement at the apex of the tip, which can be easily suppressed by contaminations from indentations of the probe in the nanoscale mechanical measurement. For the same reason, other nanoscale near-field spectroscopic methods, such as tip-enhanced Raman spectroscopy (TERS) or aperture-based near-field scanning optical microscopy (NSOM) are not suitable for joint measurements with mechanical data acquisition.

Given the interest in spectroscopy-related characteristics of samples on a much smaller length scale, preferably the nanometer scale, continued improvement was desired to expand the range and efficiency of performing optical imaging and spectroscopy for chemical identification on the nanoscale.

SUMMARY OF THE INVENTION

Using Peak Force Tapping® (PFT) mode AFM, the preferred embodiments overcome the drawbacks with the prior art to provide a system capable of both IR imaging and IR nanospectroscopy. By using a readily accessible low cost tunable pulsed infrared light source that is triggered at some fraction of the PFT mode AFM operating frequency (e.g., ½ the PFT mode drive frequency), pulsed laser radiation is applied to the sample, for example, every other cycle of PFT mode AFM operation to provide adjacent cycles of deflection data, one reflecting deflection caused by both probe-sample interaction and pulsed radiation and the other reflecting deflection without the effects of pulsed radiation. A subtraction of the corresponding data provides an indication of the probe mechanical response induced by the laser pulse acting on the sample, thereby allowing the user to generate a spectroscopy spectrum at high, sub-20 nm, resolution. Alternatively, the technique can be applied with a laser pulsing at the same frequency as the PFT cycle, thus increasing the duty cycle and signal-to-noise. In this embodiment no IR un-pulsed deflection signal, i.e. deflection signal without IR illumination, would be used.

In one preferred embodiment, a method of performing spectroscopy using an atomic force microscope (AFM)

comprises causing a probe of the AFM to interact with the sample in the oscillating mode of PFT AFM operation with a drive signal, controlling the AFM based on the probe-sample interaction, and providing a pulsed laser to generate an IR pulse. The oscillation frequency of the AFM operation is substantially (at least 10×) below the cantilever resonant frequency. The method further comprises directing the IR pulse at the probe tip causing IR induced transient surface modification, detecting the deflection of the probe with a detector; and determining a flexural response of the probe due to the IR induced surface changes from the detected deflection. Transient surface modifications comprise surface motion such as sample expansion or retraction but also charge accumulation, charge displacement, sample polarization or collective charge oscillations in organic, inorganic matter and polaritonic materials (e.g. graphene, boron nitride) that lead to a detectable deflection signal under pulsed IR illumination.

In another embodiment, the IR induced flexural response that is an indication of the surface pulse force exerted on the probe is obtained as the offset between the deflection signals with and without IR laser pulses. Alternatively, only IR pulsed traces may be used and the offset is extracted as difference in the deflection signal before and after the laser pulse.

In another embodiment, IR wavelength-dependent localized sample surface modification is measured as a change in the slope of the deflection signal after the IR pulse.

Another embodiment uses the time delay or signal strength of the minimum in the retract curve of the PFT cycle after probe-sample interaction as a measure of the IR induced surface pulse force.

A different implementation extracts the signal indicative of the IR surface modification as a phase shift or change in amplitude or frequency of the free oscillation of the cantilever in PFT mode after contact between probe and sample has ended.

According to another embodiment, a method of performing spectroscopy using an atomic force microscope (AFM) comprises causing a probe of the AFM to interact with the sample in PFT mode of AFM operation with a drive signal, providing a pulsed laser to generate an IR pulse, and directing the IR pulse at the probe tip. The method further comprises synchronizing the IR pulse with cycles of the drive signal so that the IR pulse interacts with the probe tip and sample every other cycle of probe-sample interaction, and detecting the deflection of the probe with a detector. Alternatively, IR light pulses that are synchronized to the probe-sample interaction are selected by a pulse selector to choose a sequence of IR pulsed and IR un-pulsed interaction cycles. For instance, the pulse selector may allow all IR pulses to pass so that every probe-sample interaction cycle is accompanied by a laser pulse. In this case no 'laser off' reference cycle is needed which increases the signal-to-noise since more light-sample interaction cycles are averaged. Alternatively, IR pulsed sequences including one or several IR un-pulsed reference cycles without laser illumination may be chosen for background subtraction.

In another embodiment the IR pulses are not synchronized with the probe-sample interaction cycles. The IR induced surface pulse force then occurs at random positions in time during the probe-sample interaction cycle, but the individual event is analyzed to obtain a signal proportional to the surface pulse force. Individual events may be summed up with others occurring in later cycles.

According to another embodiment the IR pulse may precede the probe-sample interaction cycle. The transient IR induced surface change may still modify the probe-sample interaction cycle that follows the IR pulse within several microseconds. As an example, localized IR induced mechanical property change (e.g., modulus change) may recover within 10 microseconds during which time the approach of probe and sample is affected.

Another embodiment uses more than one IR laser pulse per probe-sample interaction cycle to amplify the IR induced signal. When the $2^{nd}$ pulse occurs within the same probe-sample interaction cycle, the combined effect is observed, e.g., two IR-induced offsets, two slope changes or an increased phase shift in the free space oscillation after the cycle. More than two pulses may interact with the probe-sample system during contact which increases the signal further.

In another preferred embodiment, a method of characterizing a sample with an atomic force microscope (AFM) having a probe comprises using a pulsed light source set at a frequency to generate a pulse, oscillating the probe in Peak Force Tapping (PFT) mode, and directing the pulse at the probe and sample during the oscillating step. The method further comprises detecting a laser-induced mechanical response of the probe at certain cycles of probe oscillation at a location of the sample, providing relative lateral scanning motion between the probe and the sample and performing the above steps at a plurality of locations of the sample, and generating at least one of a nano-mechanical image and a spectroscopic image (Peak Force IR spectrum at several locations) of the sample based on the providing step.

Another preferred embodiment performs point spectroscopy. To this end the relative probe-sample oscillatory motion in PFT is performed on a single spot, i.e., without relative horizontal movement between probe and sample, while the IR wavelength is swept. At each wavelength the deflection signal is analyzed to extract the IR signal based on the providing step, resulting in data of IR surface pulse force versus wavelength. In one example, the data is IR absorption versus wavelength and can be compared to FTIR spectra for material identification.

Instead of being limited to the infrared spectral region, the radiation used to illuminate the probe-sample region may also be selected from a broader wavelength range including ultraviolet, visible, near-infrared and terahertz.

In another embodiment the probe-sample interaction region is illuminated from the bottom with a pulsed light source in the case of an opaque sample or a sufficiently thin film. Another implementation for bottom illumination employs mounting the sample on a prism and employing total internal reflection at the sample region.

Another embodiment measures the peak force IR response on a sample in a wet or liquid environment. In order to minimize absorption of light in the liquid, bottom illumination may be applied while the liquid only occupies the upper half space that contains probe and sample.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 4A-4D are plots that illustrate the PFIR technique of a preferred embodiment using background subtraction and synchronously averaging the cantilever response;

FIGS. 16A-16H schematically illustrate measuring the IR response based on characteristics of the deflection data obtained using the PFIR techniques of a preferred embodiment;

FIGS. 19A-19E schematically illustrate the PFIR system set up for several embodiments with alternate means of illuminating the sample with the IR pulses, including measurements in a fluid environment.

DETAILED DESCRIPTION OF THE PREFERRED EMBODIMENTS

Figure 1:
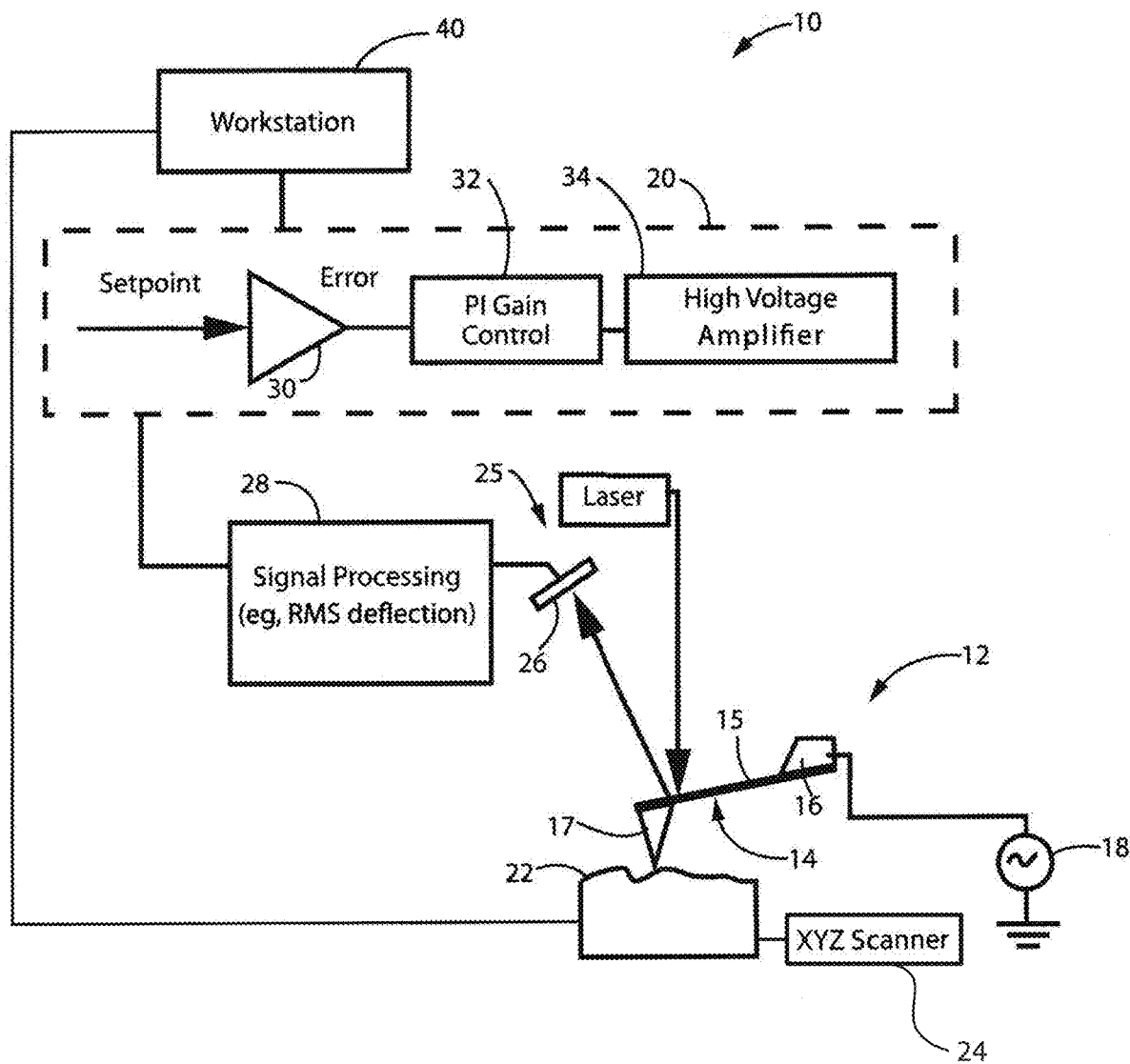
FIG. 1 is a schematic illustration of a Prior Art atomic force microscope AFM.
Figure 2:
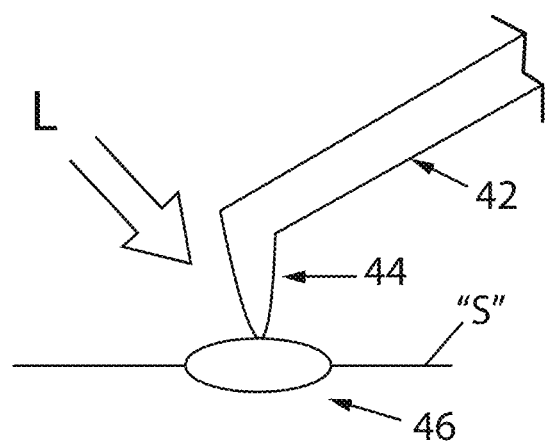
FIG. 2 is a schematic illustration of the peak force IR (PFIR) set-up of the preferred embodiments.
Figure 3A:
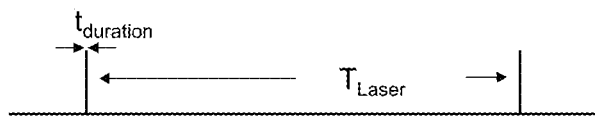
FIGS. 3A-3F schematically illustrate the operation of the PFIR technique of the preferred embodiments.

Referring initially to FIG. 2, the general concept of the PeakForce IR (PFIR) system and technique of the preferred embodiments is shown. The PFIR technique includes directing an electromagnetic beam "L" in the mid-IR range (approximately 2 micron to 20 micron) toward the surface "S" of a sample at a location at which a tip 44 of a probe 42 is positioned (the probe-sample interaction zone being the sample location under or adjacent the tip apex) so as to induce sample modification 46, e.g., in the form of surface motion, charge accumulation/displacement and/or sample polarization resulting in mechanical or electromagnetic surface pulse force in response thereto. More particularly, a pulsed laser beam directs pulses at the tip and sample at a localized measurement position. A pulsed laser "L" is used to allow the sample to cool down prior to the next pulse interacting with the next cycle of tip-sample interaction. Note that in another embodiment and depending on the thermal conductivity of the sample, the pulse repetition frequency may be not low enough to allow full cooling to equilibrium condition. In this scenario the PFIR signal per cycle will be reduced. The same may apply when more than one pulse is present within a single probe-sample interaction cycle, as discussed below. The IR pulses used in the preferred embodiment of FIG. 2 are shown in FIG. 3A with a pulse duration $t_{duration}$, that can lie in the picosecond to 100s of nanoseconds range.

Figure 3B:
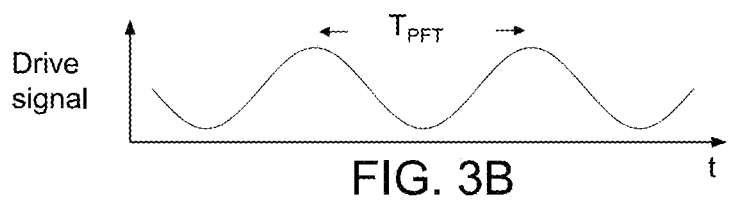

In this case, probe-sample separation is modulated in an oscillating mode of AFM operation (PFT Mode) at a selected frequency, $f_{PFT}$ (with a period $T_{PFT}$) using a drive signal such as that shown in FIG. 3B. In this example the laser pulse period $T_{Laser}$ is twice the PFT period $T_{PFT}$. In another embodiment IR light pulses that are synchronized to the probe-sample interaction are selected by a pulse selector to choose a sequence of IR pulsed and IR un-pulsed interaction cycles, the latter used for reference as described below. For instance, the pulse selector may allow all IR pulses to pass so that every probe-sample interaction cycle is accompanied by a laser pulse. In this case no 'laser off' reference cycle or IR un-pulsed cycle is needed which increases the signal-to-noise ratio since more light-sample interaction cycles are averaged. Alternatively, one (1) or several reference cycles without laser illumination may be chosen for background subtraction (described further below).

Figure 3C:
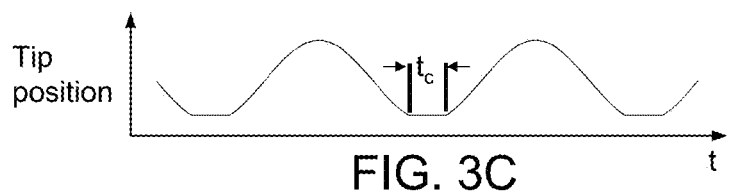
Figure 3D:
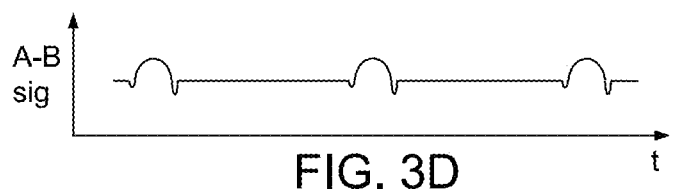
Figure 3E:
Figure 3F:
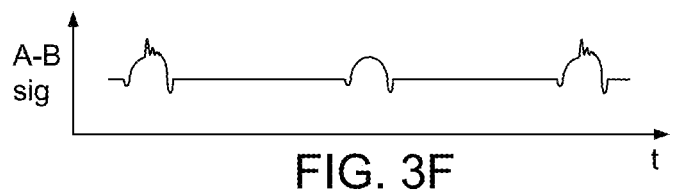

To ensure that tip 44 interacts with the localized region of the sample at the same time the IR laser pulses cause an induced surface pulse force at that location, the pulses are synchronized to the transient probe-sample interaction portion of the oscillation cycle. In this way the pulse of duration $t_{duration}$ lies within the probe-sample contact time $t_c$ corresponding to the transient probe-sample interaction time in FIG. 3C, which shows the tip position in the PFT cycle. The resultant induced surface pulse force can be measured mechanically as a localized deflection of probe 42, indicative of the transient probe-sample interaction force. FIG. 3D shows the vertical deflection signal or the A-B signal of the photodiodes that monitor the probe deflection. During the oscillating motion that is provided by the drive signal in FIG. 3B the probe periodically comes into contact with the sample (FIG. 3C), and these contact events of probe-sample interaction are changed by the laser pulses that fall into the contact time. These IR pulses are repeated in FIG. 3E. As described below, the synchronized IR laser pulse modifies the probe-sample interaction cycle as illustrated in FIG. 3F, for instance, by inducing a contact resonance oscillation, an offset jump or step from sample expansion or retraction, or a change in slope in the deflection signal after the IR pulse due to mechanical property changes, such as hardening or softening of the sample under the tip. These transient changes persist for several microseconds. In an alternative embodiment the laser pulse may precede the contact time by several microseconds so that any transient IR induced surface modification is still affecting the probe-sample interaction since it has not equilibrated yet. In that case the surface modification may cause an earlier (later) probe-sample contact caused by sample expansion (contraction), or a modified adhesion and softening (or hardening) that changes the slope of the rising edge of the contact deflection signal (not shown). The described scenarios cause noticeable effects for IR pulses preceding the contact time.

FIG. 4 illustrates synchronously averaging multiple cycles of probe deflection and applying the same to experimental PFIR data to enhance signal to noise ratio in the detected surface modification. Turning initially to FIG. 4A, a sequence of consecutive IR pulsed and IR un-pulsed PFIR deflection signals are shown in the time domain for an example in which IR pulsed and IR un-pulsed cycles alternate. The corresponding laser pulse sequence is displayed in FIG. 4B.

With further reference to FIGS. 4A and 4B, the laser pulses are synchronized to the peak force tapping cycle so that the relative timing of the laser pulse with respect to the PFT cycle is controlled and, in the preferred embodiment, constant. The trace difference "d" between the IR pulsed and IR un-pulsed cycles is illustrated in FIG. 4C. The temporal positions of the pulses are marked as "1", "2" and "i" in FIG. 4B. This temporal position is used to mark the starting point of each group of data in the pulsed IR responses acquired in FIG. 4A.

The sequence of data represented in FIG. 4C illustrates background subtracted data. More particularly, each set of the "background subtracted data" (trace differences $d_1$ to $d_i$) in FIG. 4C is obtained by subtracting consecutive un-pulsed data in FIG. 4A from the pulsed data in FIG. 4A. The time reference of the data alignment was provided by AFM control in PeakForce Tapping mode, referred to as "synchronization distance" in the prior art. Consequently, the trace difference has a value close to zero on the left-hand side, before the IR pulse, since both IR pulsed and IR un-pulsed PFT cycles are not altered before the laser pulse hits the probe-sample region. After the IR pulse, the main features of the IR induced surface pulse force (i.e., induced surface modification) are visible in the trace difference, namely the offset in the deflection signal, the free oscillation after the probe is released from the sample, and the contact resonance oscillation at about the offset step. The individual trace differences $d_k$ with k=1, 2, 3 . . . i are noisy in this example. Better signal to noise is obtained when averaging the trace differences, explained immediately below.

Turning to FIG. 4D, synchronously averaging the cantilever response is shown. The averaging is based on the arithmetic mean, i.e., the trace differences (or background subtracted data) $d_k$ are summed and divided by the number i of the trace differences. It is important that the starting point of each set of pulsed responses of the deflection data is the pulse time stamp. The pulse time stamp/marker is therefore used as the synchronization reference for data averaging the sets of pulsed deflection. In the displayed example i=5 trace differences were averaged, yielding the result shown in FIG. 4D.

The conventional method to increase signal-to-noise ratio is to average data in frequency space, i.e., Fourier transform (FFT, fast Fourier transformation) time based data into frequency space and perform arithmetic averaging. This data treatment may cause several problems that can result in oversight or suppression of important features. First, the signal repeats on typical time scales of 0.1-1 ms resulting in a FFT spectral resolution of order 1-10 kHz for FFT of individual traces. The DC component of the FFT is the mean of the signal and would be an indicator of the offset step. However, the DC component at 0 Hz would also contain adjacent frequency contributions due to the coarse 1-10 kHz resolution of the FFT. Especially, 1/f-noise of the data acquisition electronics would pollute the 0 Hz component, turning it rather unreliable and difficult to interpret and separate from noise. Another point is that the contact resonance is an important and pronounced feature of the IR-induced signal but lies at frequencies of 100s of kHz outside the 1/f noise. Hence, it is easy to distinguish, to separate and interpret and appears naturally preferred when looking at the contact resonance as a signal. For FFT treatment it is also often a standard procedure to remove any offset or slowly varying background, i.e., to apply some sort of high-pass filter to the signal or place a FFT window only around the obvious contact resonance oscillation. In this way the difficult-to-interpret low-frequency components that include noise and are smeared out by coarse spectral resolution would be suppressed before the actual FFT calculation. In our case it turns out, however, that PFT is sensitive enough to operate at low force setpoints resulting in strong offset signals (see below, especially FIGS. 8-10). Hence, time-domain data treatment is essential in PFIR. In the synchronization averaging method of the preferred embodiments the DC component, such as offset, is preserved. Note that synchronized averaging, for instance, increases the signal-to-noise ratio of the contact resonance oscillations without smearing them out, which may occur if the laser pulses were not synchronized to the PFT cycle, i.e.,—destructive interference could occur when averaging. Synchronized averaging in the time domain can be performed here since the IR pulses are synchronized to the PFT cycle, i.e., in each IR pulsed PFT cycle the IR pulse hits the probe-sample region at the same relative temporal offset (e.g. compared to the sync distance in PFT) with respect to the PFT cycle. We note that synchronized averaging can also be applied directly to the traces in FIG. 4A. In this case the trace difference can be obtained from the averaged IR pulsed and the averaged IR un-pulsed cycles, or, in one embodiment, the average of all IR pulsed traces can be analyzed directly without the need for IR un-pulsed cycles.

Figure 5:
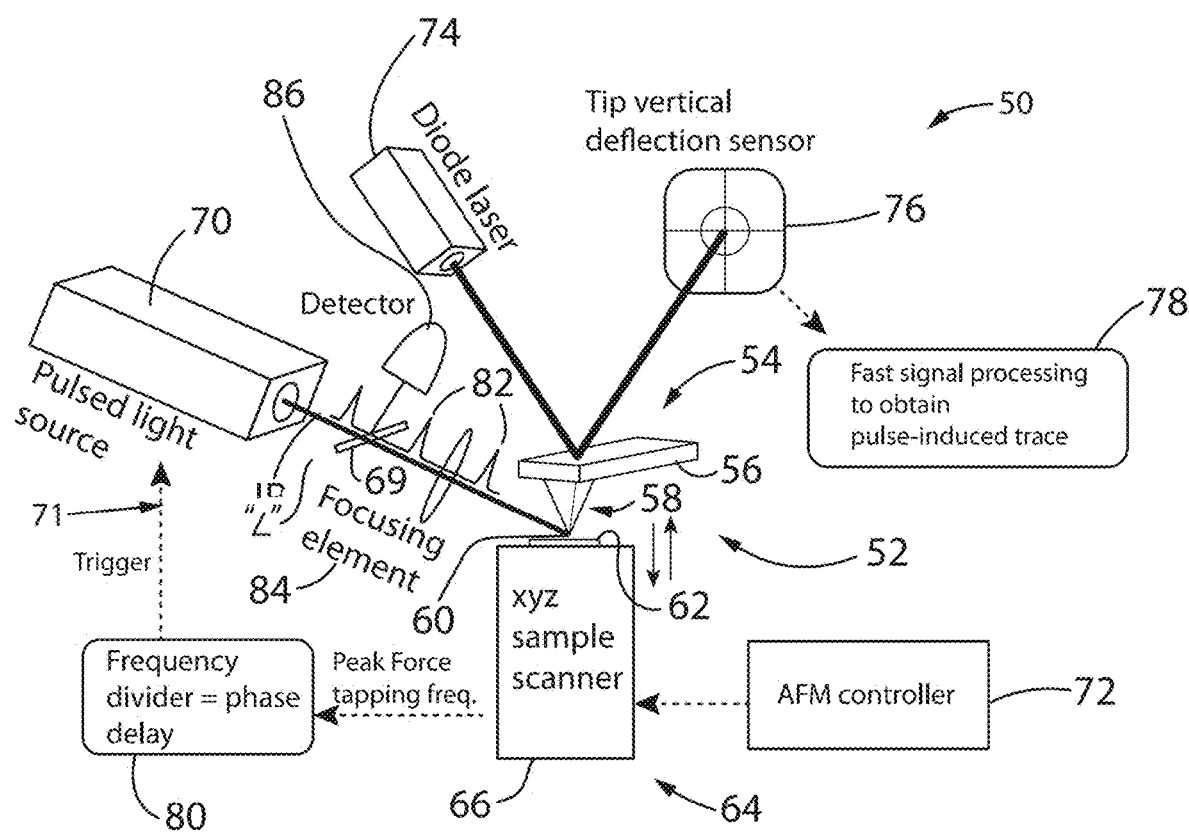
FIG. 5 is a schematic illustration of a PeakForce IR system set-up according to a preferred embodiment, including an AFM probe tip interacting with a sample and excited by a tunable pulsed IR source.

Turning to FIG. 5, the above-described concepts are implemented in a PeakForce IR, or PFIR, system 50 including a scanning AFM 52 that employs a probe 54 including a lever 56 supporting a tip 58 having an apex 60 that interacts with a sample 62, AFM 52 having peak force tapping capability (for example, a Multimode AFM with a Nanoscope V controller offered by Bruker Nano, Inc.). Sample 62 is mounted on a stage 64 of the atomic force microscope including a three-dimensional piezo scanner 66. A frequency tunable pulsed infrared light source 70 that preferably provides infrared radiation (IR) that matches the vibrational resonances of molecules in the material under test, i.e., sample 62. (Note that while an IR source is preferred, the wavelength of the light source output may be from ultraviolate to far-IR (for example, about 100 nm to 1 mm), with the preferred mid-IR range being approximately 2 micron to 20 micron). Laser 70, such as a quantum cascade laser (MIRcat, Daylight Photonics) or optical parametric oscillator, a customized circuit for synchronization 80 that can contain an electronic pulse-selector circuit to suppress trigger pulses that trigger the IR laser output, and a customized optical setup 71 that delivers pulses of the focused infrared beam "L" to the region of a tip 58 of probe 54 and sample 62 are also provided. Preferably, the relative position between the focus of the infrared beam "L" and the tip 58 is constant during IR data acquisition, i.e. the optical alignment to the tip is unchanged during IR absorption mapping across the sample and during point spectroscopy at a fixed sample location as described below. This ensures that during an IR scan of the surface at a single IR wavelength the light intensity at the probe-sample interaction region where surface modification occurs is constant so that the surface response to the IR light can be quantitatively compared at different locations.

In a different embodiment the IR laser spot may be much larger than the AFM scan area so that light intensity variations while scanning the probe relative to the IR illuminated spot may stay sufficiently constant during scanning, e.g., within 10%. As a result, IR data at different positions of the probe are only accurate to within 10% in this example since the laser power varies. In another embodiment the described effect of relative motion between probe and IR illumination area can be compensated. One way is to follow the probe position with the IR illumination spot during scanning. Another is to measure the spatial variation of the IR signal on a sample with a homogeneous IR response. Once the 3-dimensional PFIR response is acquired for different xyz positions of the probe with respect to the IR illumination spot while the probe is in contact with the sample, measurements on other samples can be corrected for the spatial IR light variation.

The customized optical setup 71 may contain an electronic, optical or mechanical pulse selector (see FIG. 20) to suppress pulses within the IR beam. The pulse selector can be an electronic circuit that changes the pulse sequence in the electronic trigger signal that drives the synchronized IR light source, causing the emission of a defined "ON"/"OFF" pulse sequence. Alternatively, the IR pulses can be selected within the laser output beam "L" via optical means, e.g., by an acousto-optical modulator, electro-optical modulator, or a Pockels cell. A mechanical pulse picker (chopper) or rotating mirror can also allow only selected pulses to pass towards the tip while blocking unwanted pulses. It is understood that these elements may be inserted in the IR output of the IR light source, or they can be part of the IR light generation process within the laser system itself. In that case, for example, a Pockels cell may serve as a pulse selector to select the pump-laser pulses in an optical parametric oscillator or amplifier that drive the IR light generating process. The IR light beam "L" is linearly polarized along the tip 58 resulting in field enhancement at the apex 60 of the typically conductive or metal-coated tip 58, a similar experimental condition as known for TERS or s-SNOM. Nonconductive tips and vertical light polarization with respect to the tip result in reduced signal. An atomic force microscope controller 72 provides feedback control for the atomic force microscope, e.g., controlling the Z-position of sample 62 using XYZ scanner 66. Notably, and importantly, the atomic force microscope controller 72 is equipped with Peak Force Tapping mode capability, as described above.

The vertical deflection of probe 54 is detected using conventional beam-bounce optical detection with a diode laser 74 and a position sensor 76 (4-quadrant photodetector). The vertical deflection is measured and routed to a signal acquisition device 78. A customized circuit 80 that synchronizes and delays the timing of the laser pulses with the Peak Force tapping cycle is also provided and described in further detail below.

In operation, light source 70 preferably emits a laser pulse 82 for every other cycle of Peak Force tapping AFM operation. A pulse selector can change this sequence of IR pulsed and IR un-pulsed probe-sample interaction cycles. A focusing element 84 focuses the infrared laser pulses 82 to apex 60 of tip 58 and an infrared detector 86 measures the output (IR) of the infrared light source for power normalization, doing so in parallel with the Peakforce IR measurement. The optical path between optical IR detector 86 and source 70 is chosen to be the same as the optical path between laser source 70 and tip 58, in order to effectively compensate for the infrared absorption from the water vapor in the air.

In PFT, the vertical position of sample 62 may be sinusoidally modulated with an appropriate drive signal provided by a controller 72 at a low frequency of several kilohertz, substantially (i.e. at least a factor of 10×) below the cantilever resonance frequency, beneath cantilevered probe 54 in stationary position (of course, alternatively, probe 54 may be sinusoidally modulated; relative oscillation between the probe and sample is what is required). Around the upper turning point of the oscillation, the sample is in controlled contact with the Angstrom-to nanometer-scale radius of the apex 60 of tip 58 of probe 54. The maximum deflection of the cantilever during contact, hence, the peak force, is used as the set point of the feedback by controller 72 to maintain the average distance between sample 62 and tip 58. The mechanical properties of, for example, modulus and adhesion can be extracted in PFT by analyzing the time-varying trace of the vertical deflection of the cantilever.

In one experiment, the drive frequency of PFT mode is set at 2 kHz, i.e., the sample and the probe are in controlled contact for 2000 times per second. The waveform of the peak force tapping frequency is routed to a functional generator, and a customized circuit 80 to generate a phase-locked, frequency-halved, 1 kHz TTL waveform, which is used to trigger the quantum cascade laser 70 to operate in a pulsed mode. The phase of the frequency-halved TTL waveform controls the timing of the emitted laser pulse. The timing is adjusted such that the pulse illuminates the tip and sample when they are in controlled contact. In this case, Pt-coated cantilevered probes (Mikromash HQ:NSC14/Pt) may be used.

Note that the timing for the peak force amplitude feedback is preferably set to be slightly ahead of the arrival of the laser pulse, to avoid possible mechanical side effects of the laser-induced cantilever response on the feedback of peak force tapping. Because the repetition rate of the laser pulses is, in one case, set at half the PFT operating frequency, laser pulses interact with the tip and sample in every other cycle of the PFT drive.

The pulse duration of the infrared laser can be set at 20 ns. At a triggering rate of 1 kHz, the average power of the laser is between 5 to 20 which corresponds to a per pulse energy of nanojoules. The power of the infrared laser is kept low to be in the linear regime of operation of the PFIR apparatus and to avoid melting of the sample. The infrared beam from the quantum cascade laser or other IR laser source such as an optical parametric oscillator may be expanded to a diameter of, e.g., 12 mm by a reflective beam expander (not shown). The laser beam may be focused at sample 62 onto the tip region with a lens 84 or an off-axis parabolic mirror (not shown) with, for example, a focal distance of 25 mm. Diagnostic optics (not shown) with auxiliary He—Ne lasers may be used to ensure the infrared beam is focused properly. The signal from the vertical deflection of the AFM probe 54 is routed to a data acquisition block 78 to be recorded at every PFT cycle. Because the laser repetition rate is set at half of the frequency of the PFT drive in one implementation, the laser interactions happen for every other cycle of probe-sample interaction. As a result, and as discussed further below in connection with FIG. 6 two types of traces of probe vertical deflection may be obtained and processed. The first type of trace is the probe vertical (flexural) deflection corresponding to the peak force tapping cycles with synchronized pulsed illuminations. The second type of trace is acquired without the presence of laser pulses as the reference. This latter trace is the typical tip vertical deflection of conventional peak force tapping AFM operation.

The PFIR difference between these two probe vertical deflection traces are acquired by subtraction of the two traces (with laser interaction and without). In order to increase the signal to noise ratio of the PFIR trace, the gate-triggered signal acquisition is used to take the average response from many cycles of PFT operation. The waveform of the PFT drive is used to trigger the laser (after providing a suitable trigger sequence with the customized circuit and pulse selector 80) and trigger the signal acquisition at each PFT cycle. In PFIR imaging, one to fifty (1-50) cycles of peak force tapping operation may be recorded and averaged for each pixel. In point spectroscopy mode, 1-1000 cycles may be acquired for each wavenumber step.

If the IR frequency of the laser pulse matches the vibrational resonance in the sample, the energy of the infrared pulse is converted into the excitation of the vibrational modes. The energy from the laser pulse is absorbed by the sample and leads to thermal expansion in general, or contractions in special cases. The mechanical response of the sample due to the interaction of the laser pulse therewith is very rapid and is capable of excitation of the contact resonances of probe 54 that can be detected by the position sensor 76 as vertical deflections of probe 54. The presence of probe contact resonance is detected from the oscillations in the PFIR trace. The amplitude of the oscillation is registered by numerical Fourier transforms in real-time. In addition, a pronounced step in the deflection signal is generated by the IR induced pulse force as discussed later on. Since the mechanical properties of the sample change under IR illumination and sample heating, the slope of the deflection signal is another measure for the amount of IR absorbed light. After contact between probe and sample is lost at the end of the probe-sample interaction cycle the excited free oscillation of the cantilever at its resonance experiences a phase shift for the IR pulsed cycle compared to the IR un-pulsed cycle which may serve as the IR signal as well. Other samples, especially inorganic ones, may show different PFIR signal generation processes than mechanical probe-sample forces from surface expansion or retraction or shock waves. Inorganic materials with low thermal expansion coefficient may show electromagnetic probe-sample forces, e.g. from IR light induced charge accumulation, displacement or polarization. An example would be graphene that supports surface plasmons or local collective charge oscillations in the IR and to which the IR light can efficiently couple with momentum provided by the probe tip (similar as in s-SNOM). Surface and bulk plasmons may be detected in PFIR via the associated electromagnetic probe-sample forces. Similar forces could be expected for other quasi-particle excitations such as phonon-polaritons in boron nitride.

Referring again to FIG. 5, the optics that couple laser light to the tip-sample region includes pulsed light source 70 that emits directional radiation, which is collimated with necessary optical elements, such as a lens or a concave or an off-axis parabolic mirror (not shown). The collimated beam is guided toward the atomic force microscope with one or more mirrors (not shown) that reflects the radiation. The beam (IR) is focused at apex 60 of tip 58 with a focusing element 84, such as a lens, a concave mirror, or a parabolic mirror. Notwithstanding this preferred embodiment, an auxiliary diagnostic optical setup may be used to insure the focus of the infrared beam is at the apex of the AFM probe. For instance, pulsed light source 70 may include a visible He—Ne laser, the laser output of which collinearly co-propagates with the infrared laser. The He—Ne laser (or other visible laser such as a diode laser) is adjusted to focus at the apex of the probe with a focusing mirror (not shown). The He—Ne laser is used for alignment purposes since it is easier to align with a visible laser than with an infrared one (which often has low power, too). Alternatively, the laser itself may provide visible light output collinearly aligned or overlapping with the IR output, as may be the case for an optical parametric oscillator or amplifier that involves visible and near-infrared light to generate IR light in a nonlinear process.

Notably, a portion of the radiation from the source is beam-split with a beam splitter 69 and guided to infrared detector 86 to obtain the average power at the wavelength. As stated earlier, it is preferred that the optical path between the source to the detector is chosen to be the same as the optical path between the source and the tip of the AFM. The purpose is to account for the infrared absorption from the water vapor or atmospheric gases such as $CO_2$ in the air. Alternatively the setup may be purged with nitrogen gas other gases such as Ar, or it may be evacuated to prevent such IR absorption. In another embodiment, the IR detector 86 may be fast enough to measure the single IR pulses instead of averaging over many pulses. In that case the PFIR data can be normalized by the corresponding power for each IR pulse interaction. Quantum cascade lasers or optical parametric oscillators are known to exhibit pulse-to-pulse fluctuations that can reach 10-50% for low kHz repetition rates employed in PFIR or PTIR. Normalizing individual PFIR cycles would improve the signal-to-noise ratio. A mercury-cadmium-telluride (MCT) detector is such a fast IR detector that has a sufficient bandwidth of several MHz that allows monitoring individual IR pulses with kHz repetition rates.

Figure 6:
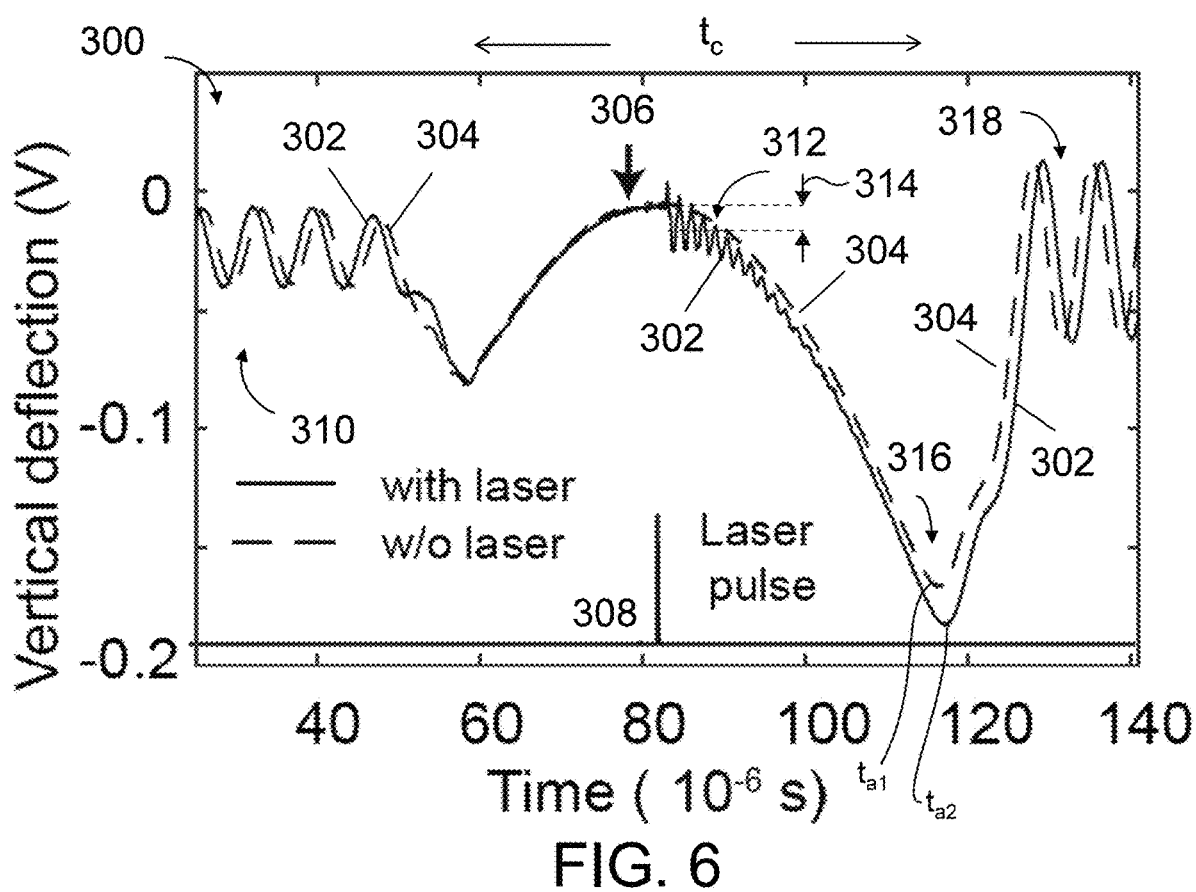
FIG. 6 is a plot of deflection vs. time illustrating probe response with and without pulsed IR radiation, according to a preferred embodiment.

Turning to FIG. 6, an illustration of the laser interaction with the tip and sample is shown.

FIG. 6 illustrates the tip vertical deflection data 300 as a function of time in a Peak Force Tapping (PFT) cycle with perturbation from the IR pulsed laser (deflection 302) and without perturbation, i.e., IR un-pulsed (deflection 304—dashed curve). In this example on a polystyrene (PS) polymer film the timing of the readout for feedback in peak force tapping control at point 306 has been positioned ahead of the laser pulse 308 in order to avoid possible laser interactions affecting the peak force tapping feedback. During approach, the free space oscillations 310 of the cantilever stop when the probe-sample contact is established (at about 60 μs in FIG. 6) and the tip and sample are in controlled contact, denoted by $t_c$. The laser pulse 308 hits the tip and sample during this contact time $t_c$. The timing of laser pulse 308 is controlled by the phase delay circuit described above. The timing is chosen to be within $t_c$ and to be at about 40% of $t_c$ in this example. Note that the contact time is generally between 1 millisecond to a microsecond, depending on the PeakForce operating frequency, and the pulse width of the IR laser is usually 100 picosecond to a few hundred nanoseconds.

Several changes occur to the IR pulsed trace 302 after the IR laser hits the tip-sample region compared to the IR un-pulsed trace 304: 1) The contact resonance oscillation 312 is excited (at a little more than 80 μs in this example). The pulsed laser should have a pulse duration $t_{duration}$ smaller than half the period of the contact resonance for optimal excitation of the resonance. 2) A pronounced offset 314 occurs between IR pulsed trace 302 and IR un-pulsed trace 304. This offset is the consequence of the IR induced surface pulse force that may result from sample expansion or retraction. 3) The mechanical properties of the sample change, as shown by a change in slope (more apparent in examples below) that is indicative of a modulus change, or by an increase in adhesion (at about point 316) which also means increased dissipation of the sample. The adhesion signal at the trace minimum 316 also shifts in time, i.e., maximum adhesion before probe retraction occurs at a later time $t_{a2}$ for the IR pulsed trace 302 than for the un-pulsed trace 304 ($t_{a1}$), another indication of IR induced mechanical property change. 4) When the probe is released from the sample a pronounced free oscillation 318 is excited with a change in amplitude, frequency and phase compared to the IR un-pulsed trace. In the example of FIG. 6, most pronounced is the phase offset. This phase change persists for hundreds of microseconds after the IR pulse, until the next probe-sample interaction stops the free-space cantilever oscillation. Note that the other IR induced changes mentioned here may serve also as a signal indicative of IR absorption or IR induced surface pulse force.

Notably, the IR pulse may even precede the contact time $t_c$ as long as the IR pulse induced surface pulse force has not decayed by the time probe-sample contact is established. An example is given by the IR pulse induced surface expansion or modulus change that persists for several microseconds, which has an effect on the rising edge of the deflection signal at contact.

Figure 7:
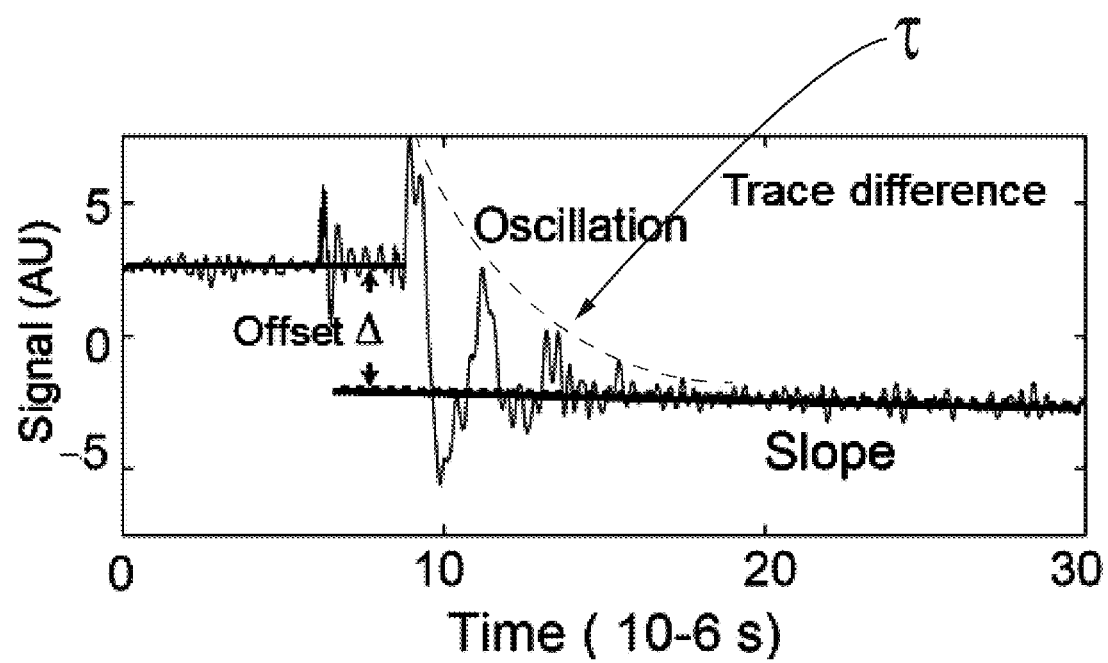
FIG. 7 is a plot of a trace difference between two cycles of PFIR oscillation, showing the offset caused by IR pulse-induced surface modification.

FIG. 7 illustrates an analysis of the trace difference between the two cycles of probe-sample oscillation presented in FIG. 6, but for a different polymer sample. More particularly, the plot shows subtraction of signals corresponding to tip vertical deflection with pulsed IR laser and without laser between two adjacent PFT cycles, yielding a trace difference. The trace difference shows three features: first, the excitation of contact resonance that is manifested as a decaying oscillation. The decaying envelope has a decay constant τ. The contact resonance oscillation can also be characterized by the peak-to-peak height or using a Fourier transform and extracting an amplitude or integral signal summed over the contact resonance peak. The second feature is a change in the slope of the baseline (marked by a solid line) that suggests a change in elastic modulus of the sample due to the laser excitation. The value of the slope can be used as the output value of the analysis of the trace difference. The third feature is given by the offset Δ (DC offset) in the baseline that occurs after the laser pulse hits the sample. In this example the offset is negative which may be caused by IR pulse induced sample contraction.

In summary, FIGS. 6 and 7 represent the transient characteristics of the cantilever probe responses when IR laser pulses are irradiated at the tip/sample contact region synchronously in both the contact time and the contact spatial locations. Specific transient characteristics include the offset representing instantaneous step response of the cantilever probe; slope of the average probe position after laser pulse heating, representing modulus change; adhesion 316 in FIG. 6, representing the contact area under the interaction force setpoint; the difference in phase and amplitude of the free cantilever probe oscillation with and without IR laser irradiation, shown in 310 and 318 in FIG. 6.

Figure 8A:
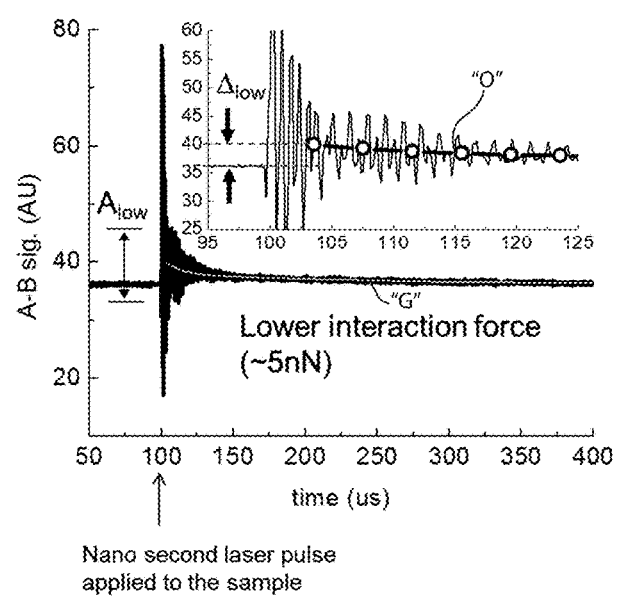
FIGS. 8A and 8B are plots illustrating displacement and contact resonance as a function of interaction force during IR induced photothermal deflection using PFIR.
Figure 8B:
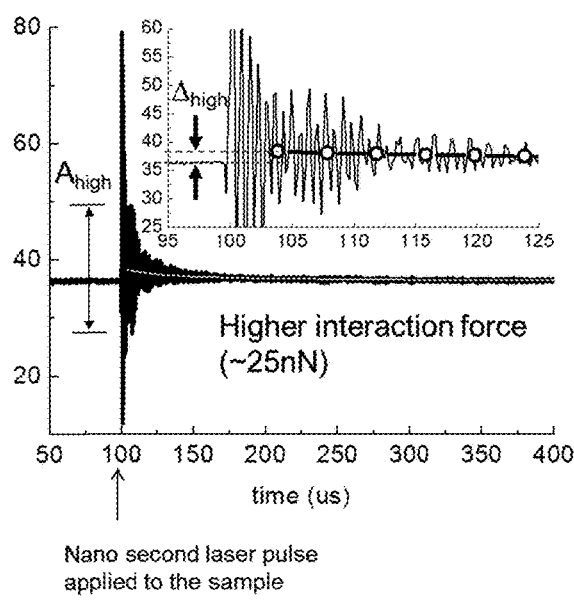

Next, with reference to FIGS. 8A and 8B, experiments that lead to the PeakForce IR detection method of the preferred embodiments are shown. In FIG. 8A, the cantilever probe is positioned to interact with the sample at an interaction force of approximately 5 nN. An IR laser pulse of 240 nanosecond width, and a few micro-watts power at 2 kHz repetition rate is applied to the sample. The instantaneous response of the cantilever probe (A-B deflection signal) to the IR induced mechanical agitation of the sample consists of two major parts: part 1, the offset $\Delta_{low}$ occurring upon application of the laser pulse where "low" represents low interaction force; and part 2, the resonance, also referred to as contact resonance, with its amplitude represented by $A_{low}$. Again, "low" represents low interaction force. The offset is obtained from fitting (here: a biexponential fit) the deflection signal (fit as grey line "G" in large panel, open dots+line "O" in zoomed-in inset). FIG. 8B shows data corresponding to an identical experiment but the interaction force is adjusted to be five (5) times higher, namely ~around 25 nN,—a subscript "high" is used to identify the measurement qualities under higher interaction force. It is important to notice that $\Delta_{low}$ is much larger than $\Delta_{high}$, while $A_{high}$ is noticeably larger than $A_{low}$. For optimized detection sensitivity, the experimental control must be adjusted to maximize Δ (delta) or A. It is clear that the control condition to maximize Δ (delta) (IR induced offset) is to decrease the interaction force to bare proximity contact, meaning the interaction force is between about 10 pN to 5 nN. To the contrary, the AFM control to maximize A (contact resonance amplitude) is to increase interaction force, at a range from about 5 nN and above. The optimum force range to maximize Δ or A may vary with the types of sample and cantilever probe used. However, the conditions for maximizing Δ and A are opposite to each other in AFM interaction control. The experiment is further summarized in FIGS. 9A-C.

Figure 9A:
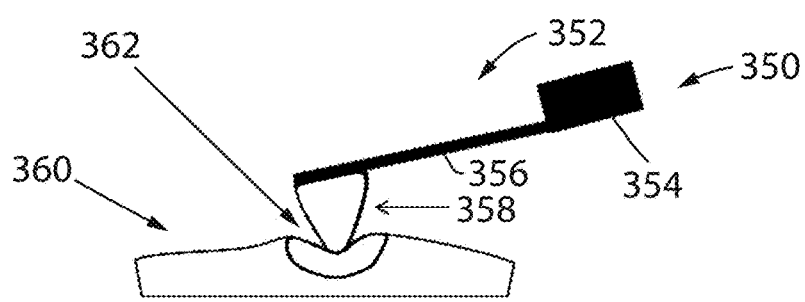
FIG. 9A is a schematic illustration of the mechanical components of the PFIR measuring system.
Figure 9B:
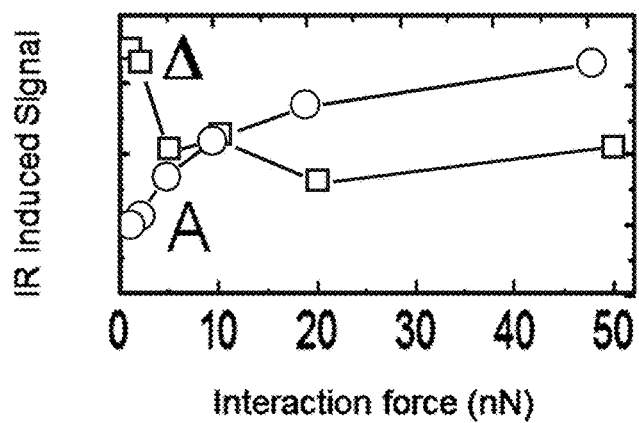
FIG. 9B is a plot illustrating the IR induced signal (contact resonance amplitude and offset) as a function of interaction force.
Figure 9C:
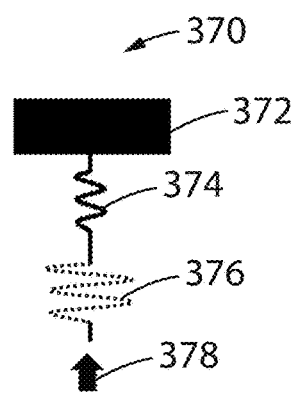
FIG. 9C is a schematic illustration of a mechanical model of the PFIR components of FIG. 9A.

FIG. 9A illustrates the key mechanical components 350 of the present IR measurement with a cantilever probe. In this Figure, a probe 352 including a cantilever 356 with a fixed end 354 and a tip 358 is caused to interact with a sample 360 using PFT AFM control. The IR induced surface force causing surface modification, such as thermal expansion, is represented by a local activation region 362 of sample 360. The tip/sample contact interaction causes an interaction induced stiffness, also called contact stiffness. Contact resonance oscillation with amplitude A represents the cantilever motion like a violin string fixed at base 354 and anchored also by tip 358. Notably, a well-defined tune of a violin needs a solid touch. Similar to the finger touch that defines the tune, well defined contact resonance needs a strong anchoring force or high contact stiffness. Therefore, as shown in FIG. 9B, the contact resonance amplitude increases with ascending force (also called force control setpoint in AFM control). The transient tip motion, on the other hand, is in counter to the contact resonance, i.e., the higher contact force makes the tip harder to move transiently, yielding smaller deflection Δ (delta), as shown by Δ curve ("boxes") in FIG. 9B, where delta descends with increasing force setpoint. FIG. 9C is an abstracted mechanical model 370. When IR laser excitation induces a surface force 378 (region 362 in FIG. 9A), this force will push the two spring system (base 372 (corresponding to fixed end 354 of FIG. 9A) and springs 374 (cantilever 356 in FIG. 9A), 376 (tip 358 in FIG. 9A)) into motion. The transient deflection represents the motion of spring 376 which stands for the contact stiffness while the cantilever 356 in FIG. 9A is represented by spring 374. A smaller interaction force with smaller spring constant of spring 376 is beneficial to larger motion of tip 358 (FIG. 9A). Higher contact force at spring 376 is beneficial to a well-defined string, like the motion of the cantilever contact resonance.

Unlike, prior systems which focus on contact resonance excited by IR induced thermal expansion, the current preferred embodiments are based on the transient motion with a probe/sample interaction force magnitude much smaller than those known systems. The preferred method to realize low interaction force control without constant contact is PeakForce Tapping mode.

Figure 10A:
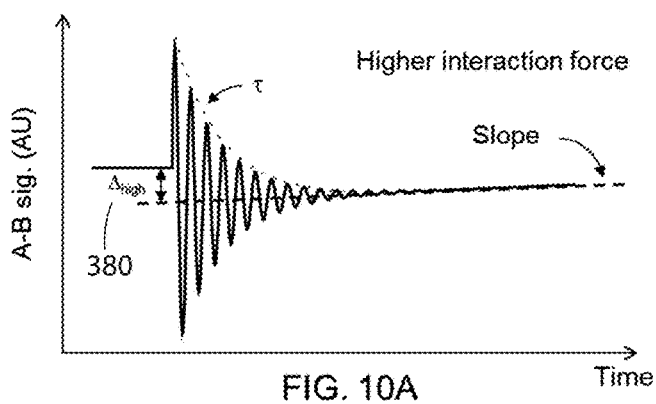
FIGS. 10A-10C are plots that illustrate the effect of PFT mode setpoint amplitude on the trace difference acquired in PFIR.
Figure 10B:
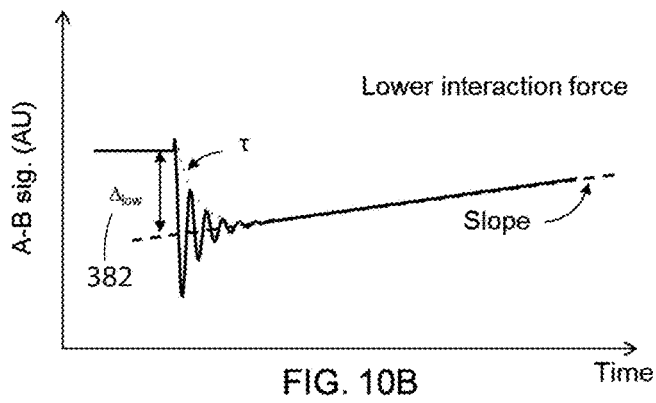
Figure 10C:
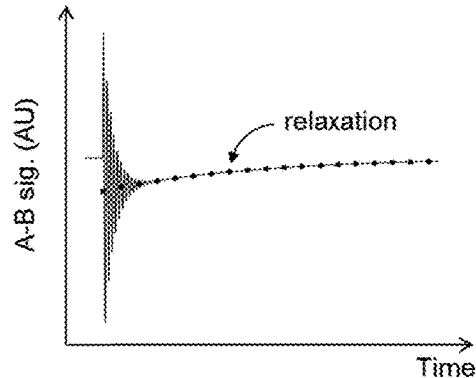

FIGS. 10A-C show schematically the effect of the magnitude of the force setpoint when employing peak force tapping (PFT) mode on the trace difference and the extracted PFIR signal. In FIG. 10A the trace difference between IR pulsed and IR un-pulsed PFT cycles is illustrated. The different characteristics of the IR induced surface pulse force include offset Δ 380, also known as DC offset or displacement after the laser pulse contacts the sample, the contact resonance oscillation with an amplitude A, a decay characterized by a decay time τ and the slope. The trace difference has been obtained for a high peak force setpoint (higher interaction force), i.e., the maximum force between probe and sample in the peak force tapping cycle was high compared to the case displayed in FIG. 10B. A lower force setpoint (see FIG. 10B) changes the trace difference significantly: (1) the offset Δ 382 increases, (2) the slope is steeper, (3) the amplitude of the contact resonance decreases, and (4) the decay τ is faster. Consequently, it may be preferred to operate at lower setpoints for increased IR signals, e.g., when extracting the IR signal from the offset Δ or the slope. Note that a lower force setpoint may decrease the IR signal strength when the contact resonance oscillation is to be used as the IR-indicative signal, e.g., after FFT of the contact resonance oscillation. Low force setpoints may be preferred for soft samples such as polymers that show large thermal expansion or contraction. For some hard materials, e.g. SiO2, with much smaller thermal expansion coefficients the offset is expected to be weak while the contact stiffness can be tuned to a large value via a large force setpoint so that the contact resonance signal is strong and can serve as the signal indicative of IR absorption. Hence, different samples may require different optimal setpoints. Note that PFT allows precise force control while minimizing tip and sample wear compared to contact mode operation.

While in FIGS. 10A and 10B the slope has been approximated with a linear fit, the "relaxation" may follow a more complicated than linear form. FIG. 10C shows a zoomed-out version of the high force setpoint signal of FIG. 10A. Here the relaxation towards equilibrium can be fitted for instance to an exponential function. From FIG. 10C it is also apparent that the best signal-to-noise performance is obtained when the IR pulse repetition rate corresponds to the relaxation time, i.e., the time where IR induced change in the trace difference has substantially relaxed. Depending on many quantities such as the time scales of the relaxation, the sample material, the sample thickness and underlying substrate material, the PFT frequency, or the PFT settings such as force setpoint, the relaxation may be finished within a single PFT cycle, or may take longer than a PFT cycle. Further note that the slope shown in the schematics of FIGS. 10A and 10B, and the relaxation in FIG. 10C may show a more complicated form. For instance, while the IR pulse may induce a sample expansion with exponential decay to equilibrium, other material properties such as modulus or adhesion may change at the same time which could lead to a negative slope in FIG. 10A as compared to the positive slope shown. Previous data (see FIG. 7) may represent such a case with a negative offset Δ and a negative slope.

Figure 11:
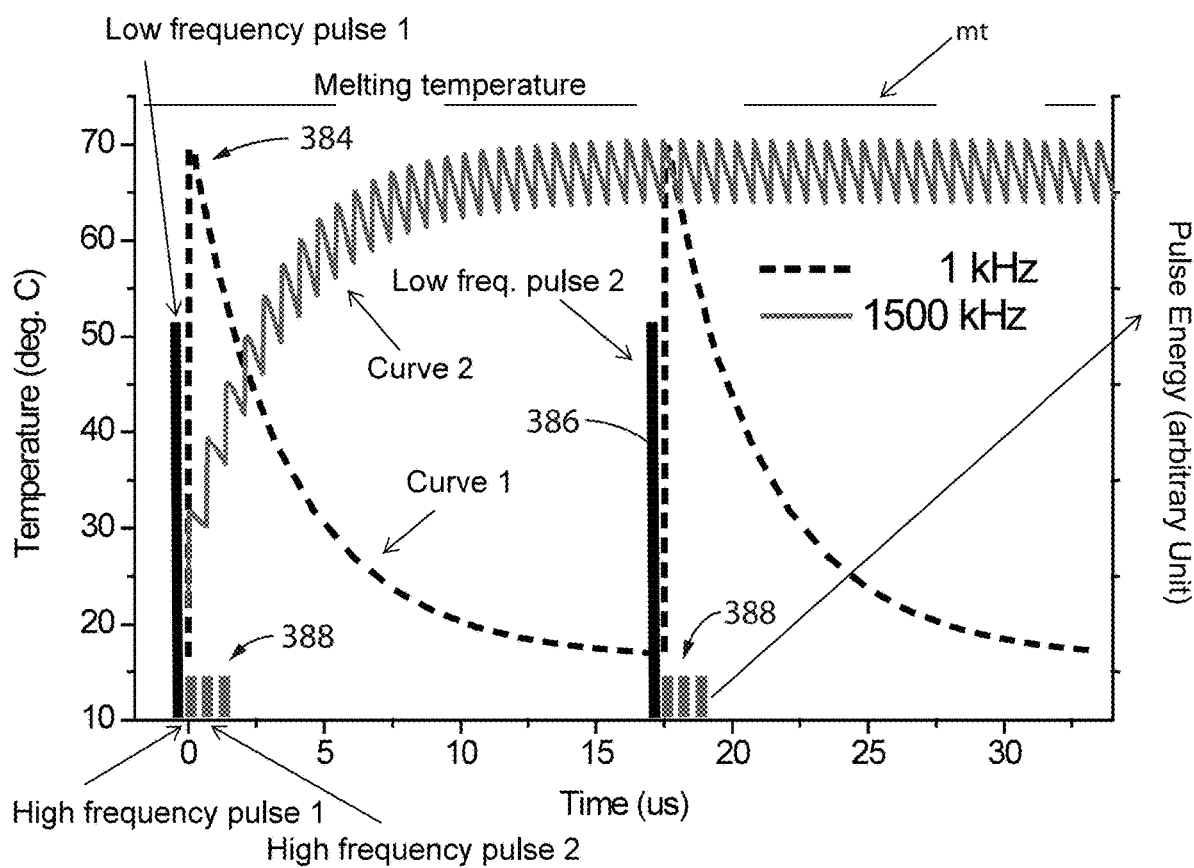
FIG. 11 is a plot illustrating the effect of pulse energy and pulse repetition rate on the sample temperature in PFIR.

Turning to FIG. 11, one aspect of the preferred embodiments is to maximize the detectable signal by irradiating IR energy to the sample with an appropriate energy level. The detectable signal scales linearly with the IR pulse energy. Such energy is limited by the sample melting point as shown in the horizontal line "mt". When the sample is irradiated by a pulse with a low repetition rate but high pulse energy (defined as the product of pulse height and width) the sample temperature will increase 384, shown as the dashed black "Curve 1." The next pulse 386 starts only when the sample has sufficiently cooled to a temperature substantially lower than the peak temperature in "Curve 1." This duration of cooling is sufficiently long to allow the next pulse with the same energy to reach a similar temperature without melting the sample in the steady state. Steady state temperature is defined as the equilibrium temperature after hundreds or more cycles. The equilibrium is generally achieved after a few tens of cycles.

In contrast, the high frequency pulses 388 do not allow sufficient time for the sample to cool. As a result the temperature continuously rises with the potential that the sample will melt. In order to achieve the same equilibrium as the low frequency pulses, the energy of each pulse must be much lower, as shown for the pulses marked "high frequency pulse" (388), and the temperature ("Curve 2"), which is calculated by finite element modeling. Finite element modeling is performed by using a commercial modelling tool, with the following inputs: the modeled material is a half-space filled with the polymer polystyrene and a disk of 10 μm diameter is heated by a laser of pulse energy 5 nJ at a pulse width of 30 ns.

The important conclusion to draw from the modeling is that the laser pulse energy and laser repetition frequency requires optimization for best signal-to-noise in the PFIR measurement. The following steps are necessary for this signal optimization: 1) In single-pulse operation or with a repetition rate substantially slower than the cooling time scale of the sample, e.g. 10-100 Hz, the highest possible pulse energy is chosen that still assures a sample temperature below its melting point. 2) The duration between pulses is determined such that the sample is sufficiently cooled. 3) The pulse train frequency is set based on the required cooling time, usually resulting in a pulse repetition frequency of about a few hundred kHz or below, which is typically sample dependent. It is sample dependent in terms of material but also in terms of geometry, i.e., thickness of the sample and type of the substrate. Importantly, when the sample includes multiple components, the component with the lowest melting temperature should be used to determine the pulse train properties. In addition, different IR source wavelengths can cause more heating due to higher absorption of the sample. Therefore, the wavelength with the highest sample absorption should be used to determine the pulse train properties in the above-noted steps 1) through 3) if a broadband spectrum is required. Alternatively, for each required wavelength during broadband spectrum acquisition steps 1-3 can be repeated to ensure highest possible pulse energy and hence optimum signal-to-noise for each wavelength. However, this procedure is rather time consuming.

Turning to FIG. 12 the PFIR method of the preferred embodiments is demonstrated on two different polymer films.

Figure 12A:
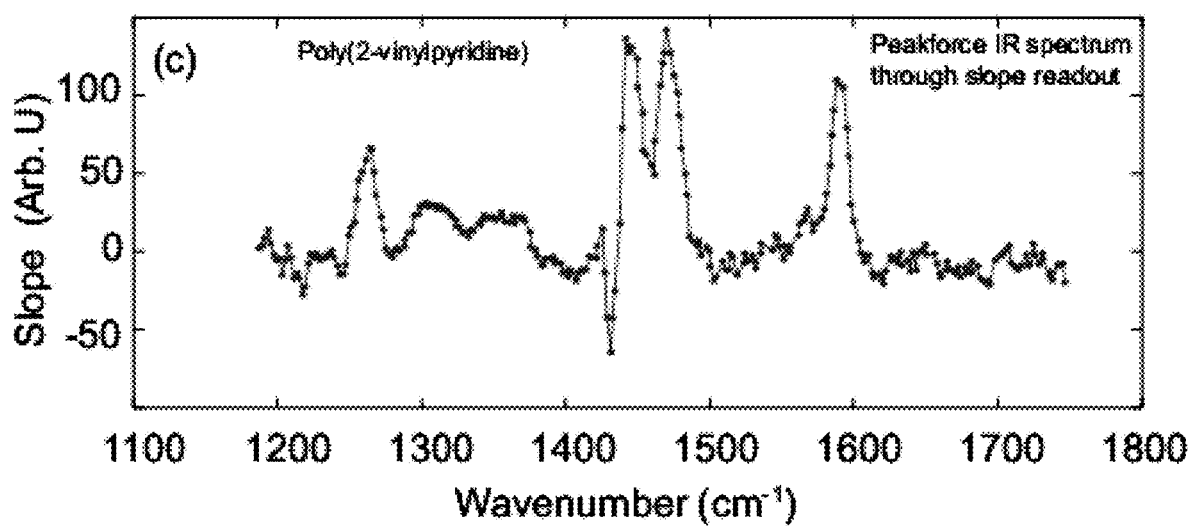
FIGS. 12A and 12B are two plots illustrating IR spectroscopy data acquired on a poly(2-vinylpyridine) and PTFE sample, using the PeakForce IR system of the preferred embodiments.
Figure 12B:
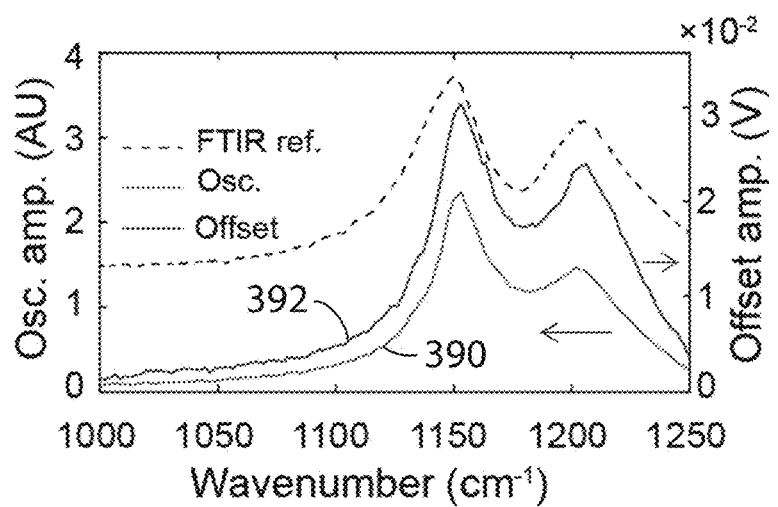
Figure 13A:
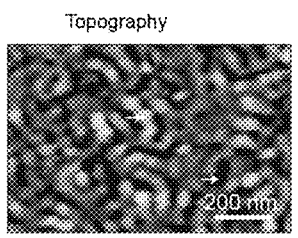
FIGS. 13A-13F illustrate data corresponding to PFIR operation, specifically IR absorption maps on a PS-b-PMMA block copolymer, simultaneously acquired quantitative mechanical data and a line profile highlighting sub-20 nm spatial resolution.
Figure 13B:
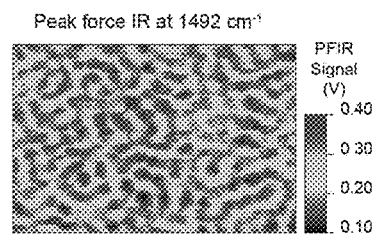
Figure 13C:
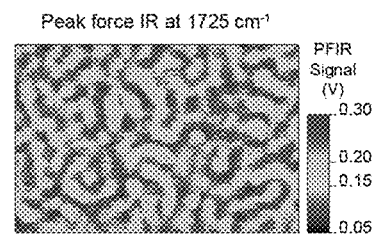
Figure 13D:
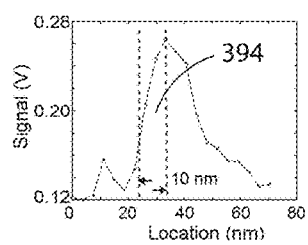
Figure 13E:
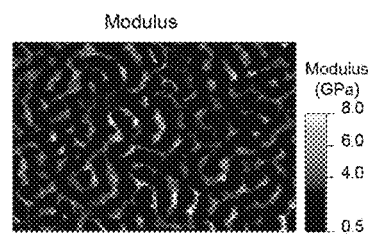
Figure 13F:
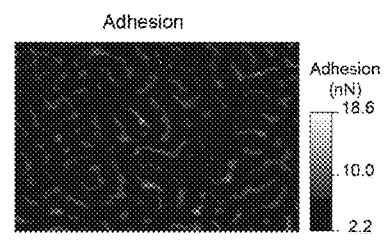

FIG. 12A shows the broadband IR spectrum of poly(2-vinylpyridine). Point spectroscopy data is presented, i.e., the IR absorption of a nanoscale sample region under the tip is obtained with the present PFIR technique. The spectrum is constructed through sweeping the frequency of the laser (horizontal axis) at a stationary sample location and recording the slope of the trace difference (FIG. 7, for example) as the output of the analysis. FIG. 12B presents the spectrum of PTFE (Teflon). The PFIR spectra are obtained from the oscillation amplitude 390 and the baseline offset 392 across its two vibrational resonances at 1160 $cm^{-1}$ and 1210 $cm^{-1}$, as shown. The FTIR spectrum for a bulk sample is included as a reference (dashed curve), showing excellent agreement with the nanoscale absorption detected using PFIR of the preferred embodiments.

In FIG. 13 PFIR demonstrates sub-20 nm spatial resolution on a PS-b-PMMA block-copolymer sample. FIG. 13A shows a topography (PFT AFM) image of the polymer domains with ~50 nm domain width. In FIGS. 13B and 13C, PFIR images were obtained using the offset method to extract the IR response while scanning the same sample area consecutively for two different IR wavelengths. At one IR wavelength (FIG. 13B, 1492 $cm^{-1}$) PS absorbs whereas at the other wavelength of 1725 $cm^{-1}$ (FIG. 13C) PMMA domains absorb. The spatial resolution is demonstrated in FIG. 13D for a line profile. Sub-20 nm resolution 394 can be readily achieved, which is on par with s-SNOM and much better than contact mode PTIR with its ~100 nm limit. FIGS. 13E and 13F show simultaneously acquired quantitative mechanical data from PFT, the modulus and adhesion, respectively. FIG. 13 is a demonstration of excellent spatial resolution beating the diffraction limit by orders of magnitude. As the modulus and adhesion images illustrate, the method is truly a multimodal spectroscopy technique where IR and mechanical data can be obtained simultaneously since both require PFT AFM operation.

Turning next to FIG. 14, the pulse sequence is shown for the case in which the deflection with IR radiation is measured for a number of cycles (IR pulsed cycles, e.g., leading to sample expansion), followed by deflection output without IR radiation (reference cycles or IR un-pulsed cycles), as described above. In particular, in FIG. 14(A), a schematic of the A-B deflection signal is given corresponding to the tip moving in (top) 395 and out (bottom) 396 of contact with the sample in an oscillatory motion with period $T_{PFT}$. When the tip is in contact with the sample, i.e., close to the maxima of the A-B signal, the A-B signal shows contact resonance oscillation from the surface pulse force if the sample was excited with a laser pulse. These photoexpansion or IR pulsed cycles can be followed by reference cycles taken without laser illumination, which serve as normalization. Though the system and method of Peak Force IR has been described using IR laser pulse excitation in one of two adjacent cycles, reference cycles are optional.

Figure 14A:
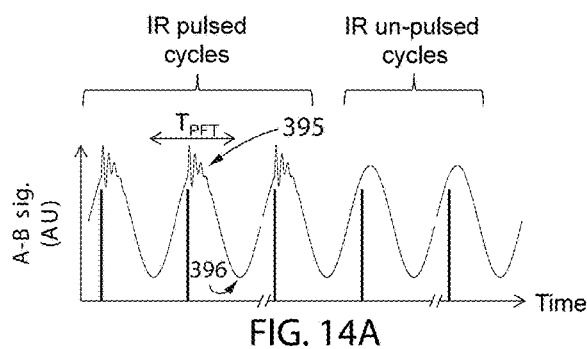
FIGS. 14A-14E are a series of plots illustrating a pulse sequence in the PeakForce IR system of the preferred embodiments.
Figure 14D:
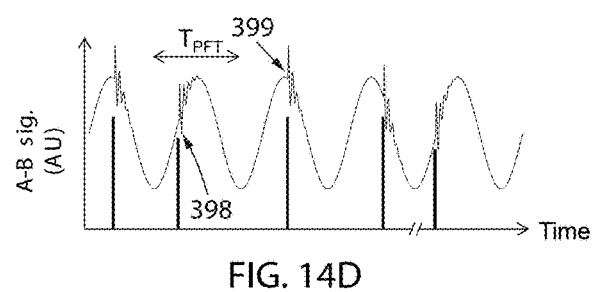
Figure 14B:
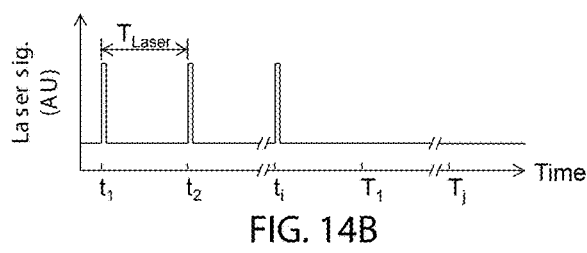
Figure 14E:
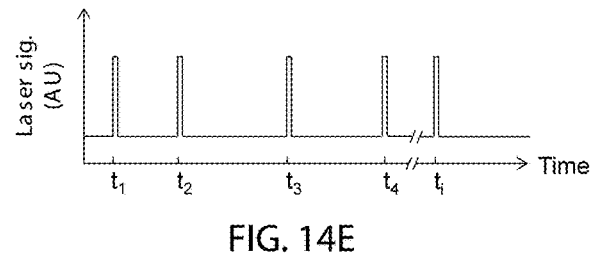
Figure 14C:
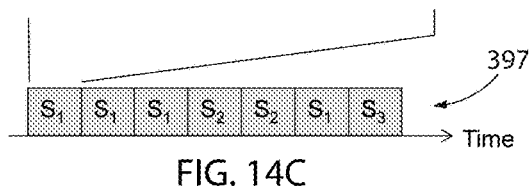
Figure 15A:
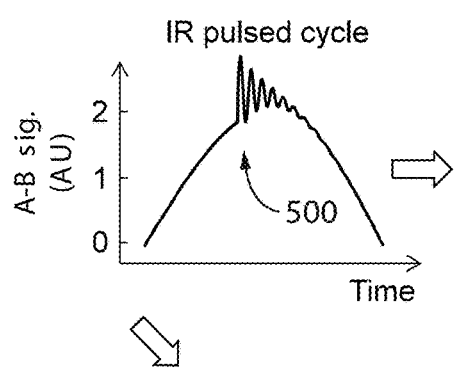
FIGS. 15A-15D are plots showing PFIR signal extraction without a reference cycle.
Figure 15B:
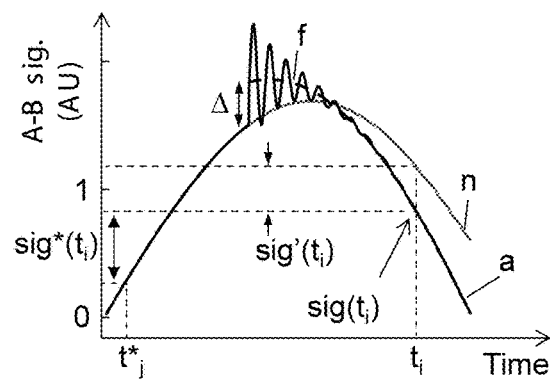

Turning to FIG. 14(B), a plot of laser signal vs time shows laser pulses with a period $T_{Laser}$ that induce, for instance, a deflection offset or a contact resonance oscillation in the A-B signal when the tip is in contact with the sample. Preferably the laser is synchronized to the peakforce tapping oscillation, i.e., $T_{Laser}=T_{PFT}$. Data can be acquired by using i laser pulses at times $t_i$ (i=1, 2, 3 . . . ) followed by j reference cycles without pulses at times $T_j$ (j=1, 2, 3 . . . ). Data taken with absent laser pulses serve as a reference to extract the surface pulse force effect, e.g., the offset or contact resonance oscillation. In FIG. 14(C), the sequence of ON and OFF pulses 397 defined in FIG. 14(B) is repeated to increase signal-to-noise by averaging over many cycles. The sequence may or may not be altered, for example, by changing sequence $S_1$ to sequence $S_2$. In one implementation i=j=1 in FIG. 14(B) and the sequence is repeated, i.e., every second PFT cycle shows surface pulse force effects which are extracted by subtracting the deflection signal from other cycles that do not include laser pulse excitation. In another implementation i=10 and j=1 in FIG. 14(B) and the sequence is repeated. In another implementation no reference cycle is used to extract data. Notably, different sequences of laser ON/OFF sequences may be used. In one case, the laser may be caused to interact with the probe tip and sample over multiple cycles of probe-sample interaction, which may be followed by multiple cycles without laser illumination for reference. Choosing a certain sequence of ON/OFF pulses may be preferred to increase the signal-to-noise ratio and strongly depends on the read-out method for the signal. For instance, if the offset represents the IR induced signal it can be measured from the trace difference of IR pulsed and IR un-pulsed deflection by fitting a line before and after the laser pulse (see FIG. 7). This requires the IR un-pulsed reference. Assuming the same noise in the PFT trace with and without laser irradiation, a ratio of 1:1 for the IR pulsed and IR un-pulsed cycles appears preferred for best signal-to-noise. But the offset signal can also be extracted from the IR pulsed cycles alone, e.g. as the difference in the deflection signal within a single PFT cycle before and after the IR pulse. In this case no IR un-pulsed cycle is necessary. The latter may have a better signal-to-noise ratio since all PFT cycles are IR pulsed cycles (hence a larger duty-cycle). However, computation might be more demanding when trying to fit a polynomial curve to the PFT cycle before and after the IR laser pulse (see FIG. 15B). Hence, signal-to-noise ratio and signal processing implementation (including computation speed considerations) largely determine the optimal IR pulse sequence.

A pulse selector ensures the desired sequence of ON and OFF laser pulses. This is achieved either by an electronic circuit that provides synchronized TTL pulses to trigger the laser, or it may be achieved via mechanical or optical modulation of the laser pulses themselves (either within or outside of the laser). For instance, a mechanical chopper can block a defined sequence of pulses while transmitting another sequence, or a rotating mirror can modulate the position of the beam to allow or permit overlap of the IR beam with the tip-sample region. Similarly, an optical pulse picker, an acousto-optical or photo-elastic modulator, an electro-optical modulator or a Pockels cell may remove pulses from a beam of IR pulses. This can be achieved by diffracting unwanted pulses away from the original propagation direction or by blocking pulses with a polarization-sensitive element after rotation of the polarization of these unwanted pulses. Although synchronization between the IR laser pulses and the probe-sample interaction cycle is preferred, it is not necessary, as illustrated in FIG. 14(D). In FIG. 14(D), the vertical deflection signal is given for IR laser pulses that arrive at the sample at different times 398,399 with respect to the probe-sample interaction cycle (see FIG. 14(E) for laser pulses).

Meaningful data related to the IR induced surface pulse force can be extracted whenever the laser pulse arrives within the contact time or within microseconds before the contact time, in which case the transient sample response has not decayed yet when contact is established. It is expected that the PFIR signal varies depending on the relative time delay between IR laser pulse and contact time. However, sufficient averaging over 10-1000 cycles gives quantitative IR spectra. For averaging, the individual probe-sample interaction cycle is analyzed with one of the IR signal extraction methods that may or may not use a reference (IR un-pulsed) cycle. To this end only those probe-sample interaction cycles are analyzed that were affected by an IR laser pulse, with the IR un-pulsed cycles serving as reference cycles or being neglected. IR pulsed cycles are discriminated from IR un-pulsed ones either by an apparent sudden change in the probe-sample interaction cycle signal (for instance, an IR-induced offset or slope change), or, if small signal-to-noise limits this approach, by monitoring the IR laser pulse arrival with a fast IR detector such as a mercury-cadmium-telluride (MCT) detector. Alternatively, an electronic trigger signal from the laser and obtained with every launched IR laser pulse may serve as an indicator of the presence or absence of IR pulses during a probe-sample interaction cycle. It is understood that electronic signal delays and optical path lengths have to be taken into account when comparing the contact time at the sample position with an external IR laser pulse monitored by a laser trigger signal or an external MCT detector.

As described, IR laser pulses may be used that illuminate the sample rather randomly, i.e., unsynchronized. If more than one (1) laser pulse is present during a probe-sample interaction cycle, this cycle may be neglected in the analysis, or the combined effect of two (2) pulses can even enhance the signal. An example would be two (2) deflection offsets in a row within one cycle or the cumulative IR pulsed effect of heating on the modulus or adhesion of the sample. Furthermore, it is understood that both laser pulse and PFT cycle periods can be constant, but different from each other. In that case the relative position in time dt between the laser pulse and the probe-sample interaction repeats after a certain number of cycles so that the data from deflection traces with the same dt can be collected and averaged as a group before signal extraction (e.g., via slope change or offset).

FIG. 15 illustrates some signal extraction options when an IR un-pulsed cycle or reference cycle is not employed, i.e., the technique does not rely on a reference cycle (i.e., no laser illumination). In FIG. 15(A), the signal of interest driven by the IR induced surface pulse force can be extracted from just the IR pulsed cycle (e.g., from photoexpansion). The trace in FIG. 15(A) shows the contact resonance oscillation 500 that can be analyzed in terms of oscillation amplitude in the time domain, or frequency domain after Fourier transformation (not shown). In FIG. 15(B), since the slope after the contact resonance oscillation is different for an interacting sample (a) compared to a non-interacting sample (n), the signal $sig(t_i)$ measured at a time $t_i$ after the oscillation is a measure of the IR induced surface pulse force. Again, PFT provides controlled probe-sample relative motion so that a PFT trigger signal provides a timing event that serves as an absolute time base. With respect to that time base, all time events including arrival of the laser pulse or signal read-out can be referenced. Since the deflection signal varies due to noise between different probe-sample interaction cycles, the signal at time $t_i$ may be compared with a signal obtained in the same cycle but for an earlier time $t^*_j$ before arrival of the IR laser pulse. In that case $sig^*(t_i)$ represents the signal as a relative signal change with respect to a reference signal before IR laser pulse arrival. Alternatively, the signal $sig(t_i)$ can be obtained in an IR pulsed and in an IR un-pulsed cycle. Subtraction of these signals gives $sig'(t_i)$, another measure for IR absorption. Individual points at discrete times $t_i$ can be measured and summed up or integrated, e.g., $sig(t_1)+sig(t_2)+sig(t_i)$, and similarly for signals obtained before the IR laser pulse arrival, or $sig'(t_i)$ and $sig^*(t_i)$. Another signal extraction method uses adjacent averaging of discrete signals obtained at discrete times, as mentioned above.

Figure 15C:
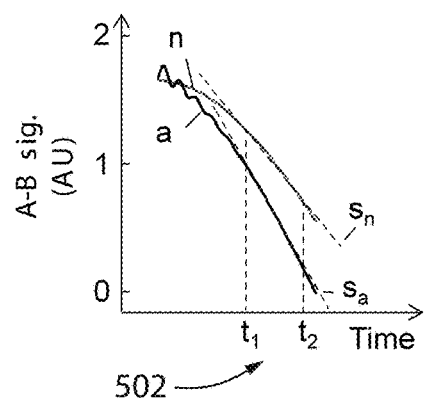

Alternatively, a low pass filter applied to the entire probe-sample interaction cycle or parts of it may suppress the rapid contact resonance oscillation. Subsequently the signals may be obtained and summed up or integrated as described before. The described signal extraction at discrete times measures the IR induced mechanical property change, e.g., in the form of a slope change associated with a different modulus. In addition it captures the offset resulting from the IR pulse force. This offset may also be obtained after fitting the IR pulsed trace with a polynomial curve "f". In FIG. 15(C), the slope for the interacting sample ($s_a$) and for comparison for the non-interacting sample ($s_n$) is shown, obtained at discrete positions in time 502 from the A-B deflection signal.

Figure 15D:
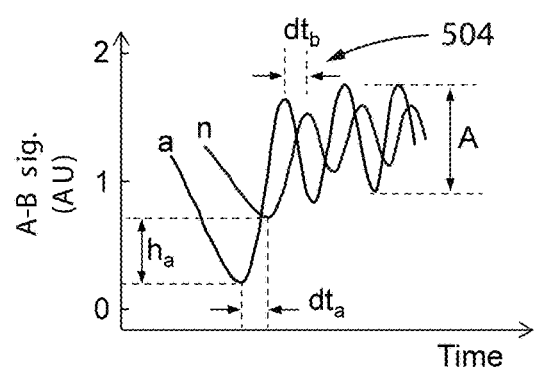

As noted earlier the surface pulse force may modify the deflection signal in the region where the probe-sample interaction cycle ends, e.g., where increased adhesion releases the probe later. This time window including the trailing edge of the probe-sample interaction cycle is illustrated in FIG. 15(D). An IR induced change is shown with the magnitude $h_a$ between interacting (a) and non-interacting (n) cycles. For polymers this may indicate an adhesion change which is then associated with a time difference $dt_a$ of the adhesion signals. When the probe leaves the probe-sample interaction region it may start oscillating 504. The oscillation amplitude, frequency, phase and decay constant of the oscillation provide a measure of the surface pulse force caused by IR illumination of the sample. When the IR pulse precedes the probe-sample interaction cycle the several microsecond long transient effects of the surface pulse force may not yet have decayed, and will still influence the slope of the rising edge of the probe-sample interaction cycle. Reversing the time axis in FIG. 15(D) the situation represents such a probe-sample contact event where a time delay $dt_a$ for a magnitude change $h_a$ can also be expected, e.g., from an IR induced adhesion change some microseconds before the contact is established.

FIG. 15 illustrates some methods to extract a signal representing the IR induced surface modification, e.g., surface pulse force. These methods were performed on the IR pulsed cycle, without use of an IR un-pulsed reference cycle. When an IR un-pulsed reference cycle is used, subtraction of IR pulsed and un-pulsed cycles results in a trace difference. The aforementioned methods of FIG. 15 can be applied to this trace difference as well to obtain, for instance, an IR absorption signal or the surface pulse force caused by IR illumination.

To summarize the invention we turn additionally to FIG. 16. The IR induced surface response of the sample in the form of a surface pulse force due to, for instance, thermal expansion/shrinkage (in response to laser excitation) can be gleaned from several characteristics of the measured deflection of the probe when operating the AFM in oscillating PFT mode. FIG. 16A schematically shows the tip 44 of probe 42 interacting with a sample in an oscillating mode while laser pulses, L, are directed at about probe 42 at a surface position corresponding to localized probe-sample interaction, thereby inducing a detectable localized surface modification 46. Preferably, the IR excitation region is kept constant in position and overlapping with the position of tip 44 during IR data acquisition. Hence, a sample scanner is preferred. This ensures that during an IR scan of the surface at a single IR wavelength the light intensity at the probe-sample interaction region where surface modification 46 occurs is constant, so that the surface response to the IR light can be quantitatively compared at different locations. Different embodiments as described earlier may rely on a larger IR spot size at the probe-sample position as for instance provided by an optical parametric oscillator that has enough power to illuminate a larger spot. If this spot is large enough (e.g. 100 µm full-width at half-maximum) IR light intensity variations are insignificant during typical relative motion of tip and IR focus (typically moving 1-30 µm) which occurs, for instance, in a probe/tip scanner instead of the preferred sample scanner. Alternatively, the IR response on a homogeneous sample in a probe/tip scanner allows mapping of the IR variation directly, which can be used for compensation.

FIG. 16B shows the PFT drive signal vs time, driving the relative oscillatory motion between the probe and sample in PFT mode with a period $T_{PFT}$. The resulting tip position is illustrated in FIG. 16C. The tip follows the drive signal in PFT until contact with the sample is established at about 510. During the contact time $t_c$ probe-sample interaction occurs. Tip movement is present but small compared to the oscillation amplitude (FIG. 16C) and occurs until the peak force setpoint is reached which is the lower turning point of the tip position. The IR laser pulses 512 in FIG. 16D have typical pulse lengths of $t_{duration}$ which are between about 1 ps and 1 µs, and typical pulse energies of 1-1000 nanojoules. The IR pulses are synchronized to the portion of the tip-sample oscillation in the relative tip position (FIG. 16C) as described above so that the IR laser pulse substantially coincides with the contact portion $t_c$ of the oscillating motion. It is preferred but not necessary that the IR pulse occurs after the time at which the PFT feedback set point is detected and the AFM adjusts for constant peak force. As stated earlier, another embodiment requires no synchronization of the PFT cycle with the laser repetition rate. In another implementation, the IR light pulse may precede the contact portion as long as the IR induced surface pulse force influences the probe-sample interaction that follows the pulse(s).

FIGS. 16E-16H illustrate several characteristics of the measured vertical deflection of the tip that are associated with the action of the IR induced surface pulse force which causes sample surface modification. Again, the surface pulse force may, for instance, originate from the surface volume change due to expansion or compression after IR light absorption, or due to softening or hardening of the sample with changes in the sample's adhesion. In addition to these mechanical property changes the surface pulse force may be caused by electromagnetic forces, e.g., from IR induced charge accumulation, charge displacement, charge oscillation such as in plasmons, or sample polarization.

In FIG. 16E, the vertical deflection of the lever is plotted. Moving from left to right, the probe-sample distance decreases while the probe performs free oscillations 514 until it snaps to the surface when contact is established and where the deflection has a first minimum, "M", due to sample adhesion. When the IR pulse hits the probe-sample interaction region, a contact resonance is excited at region "R". The amplitude of this resonance is the first indicator of the induced surface motion or modification caused by the laser pulse. In addition, an offset in the baseline between the signal "B" before the IR pulse and the signal "0" after the IR pulse is observed. This offset is measured and is a direct indication of the induced surface modification by the IR excitation pulse. Note that in FIG. 16E, the deflection signal increases with laser illumination (positive offset), indicating that in the case of an IR absorbing sample the sample surface expanded. For a non-absorbing sample, such an offset change may indicate a repulsive electromagnetic force caused by the IR pulse. Note that negative offsets can occur depending on sample properties and indicate, for instance, a shrinkage or contraction of the sample volume (see FIG. 7).

The physical origin of the offset is as follows. In case of an absorbing sample the absorbed electromagnetic energy in the region of the IR spot (and even more so at the localized field-enhanced region under tip in contact with the sample) leads to heating. Increased temperature causes different effects. For one, mechanical properties of the sample change. In one case, thermal expansion exerts a force on the tip leading to increased tip deflection proportional to the sample temperature, and hence to the amount of absorbed light. On resonance with an absorption line of the material, i.e. when the IR light frequency matches a narrow, characteristic molecular or vibrational resonance of the material, this absorbed energy is maximized resulting in maximal sample volume change. Increased temperature may also lead to softening or hardening of the sample, even to a point of localized melting that changes the probe-sample interaction forces which can be detected mechanically, for instance, by the above-described offset method. Another surface pulse force leading to a positive offset signal may be a shockwave that temporarily lifts the tip position.

In FIG. 16F, the PFT cycle shows two different slopes $S_1$ and $S_2$ at the trailing 516 and rising 518 edge of the cycle, while the probe and sample are in contact ($t_c$). The trailing edge can be used, for instance, to extract the sample's modulus via fitting with the DMT model. Hence the mechanical properties can be extracted from the edges, e.g., via measuring the slope at different sample points in the PFT cycle. For an IR pulse preceding the probe-sample interaction region transient effects such as softening of the sample with microseconds of decay time may still influence the rising edge 518 and slope $S_2$, even if the pulse precedes the cycle. Surface pulse forces may also change the points $M_1$ and $M_2$ in FIG. 16G, both in magnitude and the temporal position at which these minima occur. Point $M_1$ for instance may be associated with a change in stickiness or adhesion of the sample.

Finally, another characteristic of the tip deflection curve is the free oscillation "F" in FIG. 16H occurring after the tip has been released from contact. Its oscillation amplitude "A", frequency and especially phase depends on point $M_1$ in FIG. 16G. For instance, a large adhesion value, e.g., induced by IR absorption, as indicated by a low magnitude signal at $M_1$ results in larger probe bending, but also in a time delay of the point at which the probe is released from the surface. When the tip finally snaps from the surface this results in a larger amplitude of the free oscillation "F" exhibited by the tip. Consequently, the properties of the oscillation such as frequency, amplitude and phase are a measure of the strength of the IR induced pulse force that acted on the probe during the contact time.

Figures 17A, 17B, 17C, 17D:
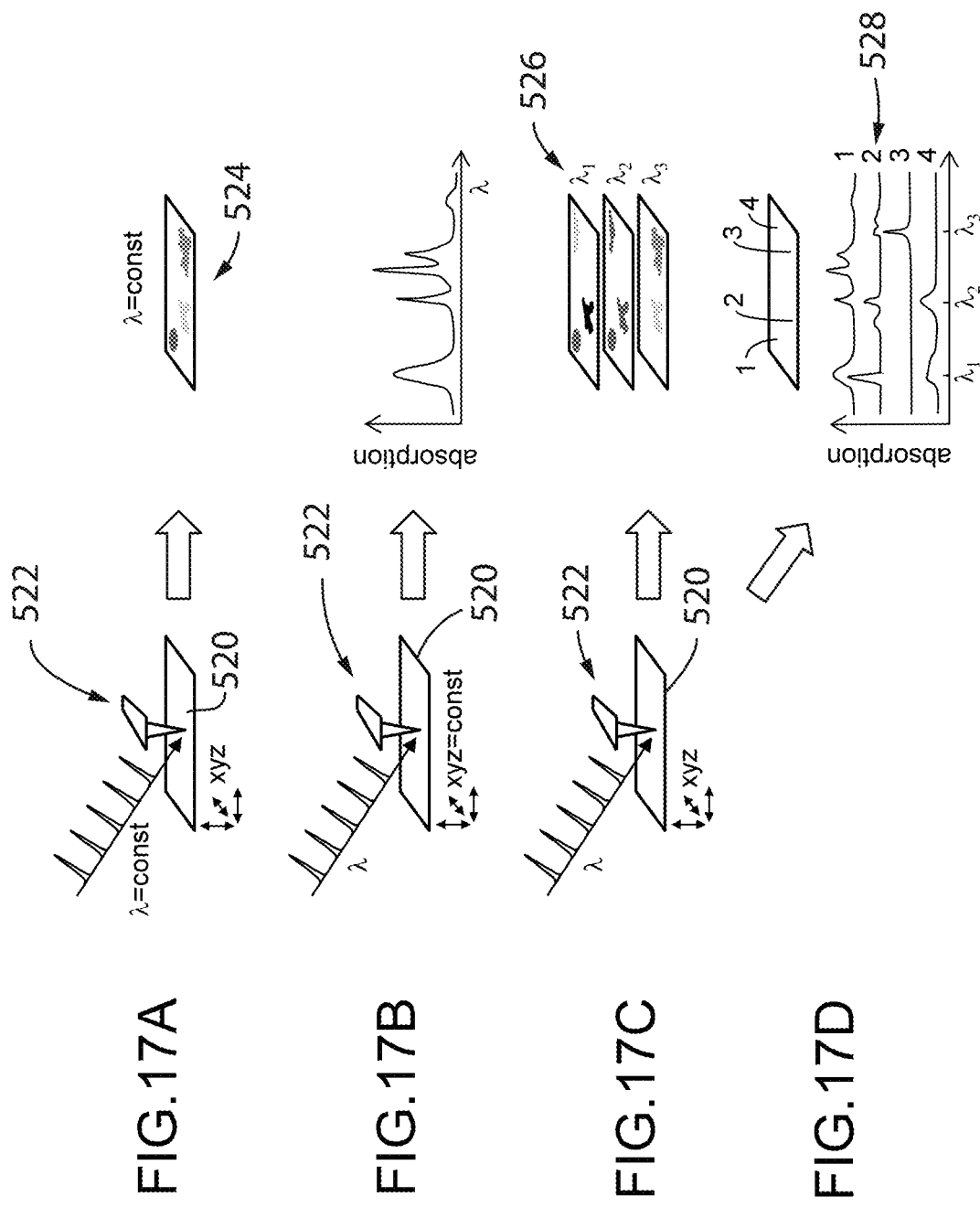
FIGS. 17A-17D are schematic illustrations of the system set up of different PFIR modes to acquire images or spectra.
Figures 18A, 18B, 18C, 18D:
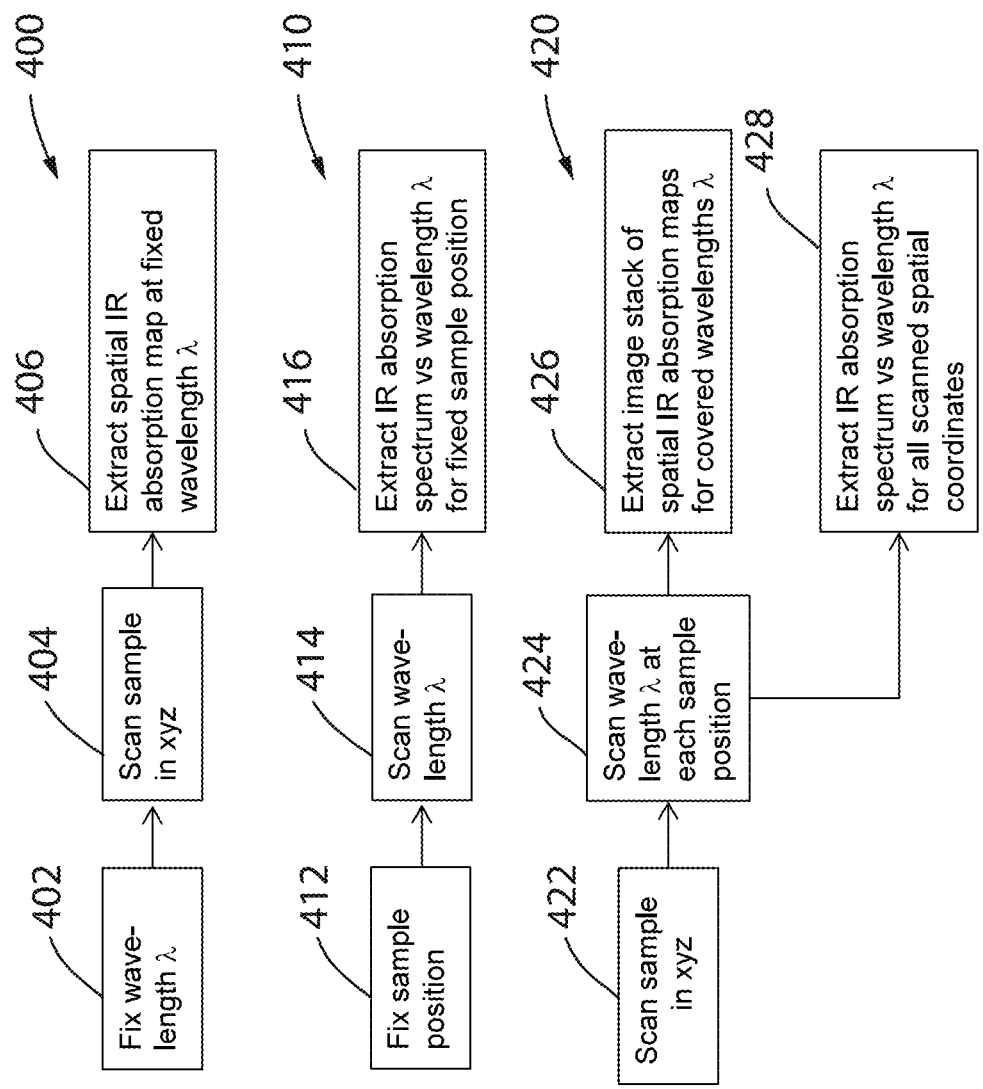
FIGS. 18A-18D are block diagrams illustrating the PFIR methods corresponding to the system set ups of FIGS. 17A-17D, respectively.

Next FIGS. 17 and 18 illustrate the different types of operations under which spectroscopic data from PeakForce IR can be obtained. FIG. 17 illustrates the schematic. FIG. 18 illustrates the corresponding method as a flowchart. In FIG. 17A the absorption imaging mode is presented, with the corresponding method 400 in FIG. 18A. A fixed laser wavelength is chosen (Block 402) in which parts of the sample 520 may or may not show an IR induced pulse force between probe 522 and sample 520. A spatial AFM scan is then performed by moving the sample on the scanner in xyz (Block 404) while the relative orientation between the laser focus point/spot and the tip remains constant to prevent misalignment. This ensures that during an IR scan of the surface at a single IR wavelength the light intensity at the probe-sample interaction region where surface modification occurs is constant so that the surface response to the IR light can be quantitatively compared at different locations (Block 406). In another embodiment, the IR laser spot may be much larger than the AFM scan area so that light intensity variations while scanning the probe (e.g., in a probe scanner where the sample is stationary and the tip moves in xyz) relative to the IR illuminated spot may stay sufficiently constant during scanning, e.g., within 20%, such that IR data at different sample positions of the probe are only accurate to within 20%, in this example. In yet another embodiment, the described effect of relative motion between probe and IR illumination area can be compensated for. One way is to follow the probe position with the IR illumination spot during scanning to always ensure perfect overlap with maximum light intensity at the tip. Another way is to measure the spatial variation of the IR signal on a sample with a homogeneous IR response. Once the 3-dimensional response is acquired, i.e., for different xyz positions of the tip with respect to the IR illumination spot, measurements on other samples can be corrected for the spatial IR light variation.

In the AFM scan under single IR wavelength illumination, data is acquired during scanning at each position with the laser being synchronized to the PeakForce Tapping cycle. As stated above, unsynchronized pulses may be used in another embodiment. Since the laser source is pulsed it is understood that the laser pulses have a finite spectral width. For spectroscopic imaging the spectral width of the laser pulses interacting with the sample in the IR is preferred to lie within $0.1$-$50$ cm$^{-1}$, even more preferred is $0.1$-$10$ cm$^{-1}$. The so-obtained scan represents a map of the IR absorption at the chosen wavelength, i.e., absorptive structures within the scanned sample area are highlighted according to their absorption strength. Likewise, maps of other IR induced surface pulse forces are obtained this way, e.g., maps of plasmons or IR induced charge distributions.

FIG. 17B shows the set up and procedure 410 (FIG. 18B) for data acquisition in point spectroscopy operational mode. Here the AFM probe is positioned over the nanoscale area of interest (Block 412). At the fixed sample location the laser wavelength is swept through the range of interest (Block 414). The probe response is then measured as a function of the wavelength of incident radiation to create an IR absorption map or surface pulse force spectrum for a single spatial position on the sample (Block 416), thus identifying the chemical composition at this specific location or probing electromagnetic effects such as plasmon oscillations.

FIG. 17C shows hyperspectral imaging, with the corresponding method 420 in FIG. 18C. While the sample is scanned (Block 422) a surface pulse force spectrum, e.g., associated with IR absorption is obtained in the wavelength range of interest for each spatial location (Block 424). To this end the spectral data acquisition time is smaller than the time that the AFM probe rests on a spot with diameter "d" (not shown). For longer spectral acquisition times the IR spatial resolution becomes larger than "d". A high IR spatial resolution can be recovered in that case if the same spatial coordinates are scanned more than once and the IR spectral information from each scan is combined to a full IR spectrum for each spatial location. The result of hyperspectral imaging is a complete data set with an IR absorption spectrum for each scanned spatial position (Block 426). The data set can be visualized in FIG. 17C as a stack of images 526 where each image corresponds to a spatial IR absorption map at a single wavelength (like the procedure described in FIG. 17A). Alternatively, the data set allows the user to extract a full IR absorption spectrum 528 (FIG. 17D) at each spatial location (Block 428 in FIG. 18D, alternative to Block 426 of FIG. 18C).

In the imaging mode of PFIR microscopy, the IR frequency of the pulsed IR laser, e.g., a quantum cascade laser, is fixed at a certain value that typically matches an IR resonance. The signals that represent the surface pulse force (e.g., from volume or modulus change) are recorded while the AFM is operating in PFT mode. The topography and mechanical data such as modulus or adhesion measured in PFT mode are simultaneously recorded together with the IR induced mechanical responses (i.e., induced surface motion or force). Preferably, the peak force set point in PFT mode is chosen to be several 10s of pico-Newtons to several nano-Newtons.

Notably, in PFIR spectroscopy mode, the probe of the AFM may stay at a single position while maintaining the PFT feedback to collect IR point spectroscopy data as discussed above. Preferably, the relative position between the focus of the infrared beam "L" and the tip 58 (see FIG. 5) is constant during IR data acquisition, i.e., the optical alignment to the tip is unchanged during IR absorption mapping across the sample and during point spectroscopy at a fixed sample location. In another embodiment, the range of relative motion between probe and IR focus on the sample has to be restricted to ensure little IR intensity variation at different scan positions. Another implementation compensates for IR variation by either actively moving the IR focus to maintain perfect overlap all the time with the tip, or by measuring the IR variation on a reference sample.

The IR frequency of the quantum cascade laser is scanned within the range of the infrared laser. At each IR frequency, the infrared interaction trace is recorded for an IR point spectrum at a fixed tip position on the sample. The values corresponding to the IR induced offset, the slope or free oscillation amplitude after probe retraction are recorded as a function of the infrared frequency of the laser source. The frequency dependence of the laser-induced changes form an IR spectrum. The frequencies of the quantum cascade laser are tuned across the spectral range while preferably avoiding strong water absorption lines in the infrared fingerprint region. The power of the laser at different wavelengths is measured with an IR detector, e.g., an MCT detector (either in parallel with the PFIR measurement or at a different time), or on reference samples that show a non-zero PFIR response that is proportional to the laser intensity at the tip and is used to compensate the collected PFIR spectra for laser power variations or atmospheric absorption. Another embodiment uses a tip that may show a non-zero PFIR response itself which could be used for referencing to the laser power at the tip location. In that case, the PFIR spectra obtained on the sample of interest, e.g., a polymer, would then be normalized by the PFIR spectra on a non-absorbing or uniformly absorbing sample such as undoped Si or Au.

PFIR microscopy has several advantages over existing infrared nanoscopy techniques. Compared to the technique of contact mode AFM-IR or PTIR that has spatial resolution of about 50-100 nm, PFIR provides much higher spatial resolution. A spatial resolution better than 15 nm has been observed. PFIR microscopy operates in peak force tapping (PFT) mode, which is more robust when measuring rough sample surfaces than contact mode, which AFM-IR is based on. While the spatial resolution of PFIR microscopy is about the same as that of s-SNOM, the experimental apparatus of PFIR does not rely on optical detection and is simpler than that of s-SNOM. In addition, scattering signals recorded with s-SNOM are very weak on polymers and inorganic samples. PFIR provides straightforward infrared spectra based on local infrared absorption, without complicated optical homodyne or heterodyne detection schemes as required in s-SNOM. The mechanical detections of PFIR are also less susceptible to probe contamination than near-field based techniques. Moreover, PFIR microscopy allows simultaneous nanoscale mechanical and chemical characterizations in one measurement with one apparatus, a feature that has not yet been demonstrated in known nanoscale characterization techniques.

The speed of PFIR microscopy scales linearly with the operational speed of peak force tapping, so long as the data processing speed is fast enough, e.g., through the utilization of onboard processing using FPGA architecture. The acquisition of a PFIR image of 256 by 256 pixels currently takes about 30 minutes at 2 kHz peak force tapping frequency. If peak force tapping frequency is increased to 8 kHz, the time will reduce to 7.5 minutes, a typical time for a frame when imaging using scanning probe microscopy.

In an alternative embodiment, the PFIR technique can employ a broader wavelength range outside the infrared spectral region, for example the ultraviolet, visible, near-infrared and terahertz or far-infrared region. QCLs and optical parametric oscillators exist as pulsed and modulated light sources in the infrared. The UV, visible and near-IR is covered by laser sources such as solid state lasers, fiber lasers, diode lasers, optical parametric oscillators or gas lasers, as well as laser sources based on nonlinear frequency conversion comprising optical parametric generation, sum-frequency generation, harmonic generation, frequency combs and related methods. In the terahertz spectral region terahertz quantum cascade lasers are emerging, while terahertz gas lasers, terahertz antennas or free-electron lasers already exist to cover that range. In the extended wavelength range from UV to terahertz, the surface pulse force during laser pulsing can originate from several effects. In the terahertz region plasmon polaritons in graphene or cooper pair polaritons in superconductors exist that may induce an electromagnetic force between probe and sample under light excitation from charge redistribution and charge oscillation. Another example is phonon resonances leading to absorption and photoexpansion in the terahertz range. In the UV, visible and near-infrared range plasmonic resonances, e.g., in metal nanostructures, exist, absorbing energy for photoexpansion or altering electromagnetic fields through their charge oscillation or charge redistribution, thereby exerting a surface pulse force on the probe.

In another embodiment the sample is illuminated from the bottom as depicted in FIG. 19A. The tip 44 of probe 42 is interacting with a sample "S" in PFT mode while laser pulses "L" are directed at the probe-sample interaction region from the bottom of the sample. A detectable localized surface modification 46 is excited. Bottom illumination requires an opaque sample "S" or a sufficiently thin film (thickness within a few wavelengths) in the wavelength range of interest to allow transmission of light to the probed volume. Bottom illumination can have the benefit of less exposure of the tip 44 and probe 42 to the laser pulses which can reduce artifacts that could occur when the probe itself absorbs light and gets heated. Another advantage is that bottom illumination may use a higher numerical aperture than top illumination since in top illumination the probe blocks part of the light while in bottom illumination the entire half space below the probe may be used for light focusing. Hence a smaller focus may result leading to a lower power requirement for the laser or less sample heating. The main benefit of bottom illumination is that it allows PFIR of samples in liquid environment, as described below.

Alternatively, as illustrated in FIG. 19B the sample is placed on a prism 48, e.g., made from ZnSe or another material that shows little or no absorption in the wavelength range of interest. The pulsed light source illuminates the prism with light "L" such that the beam undergoes total internal reflection in order for the beam to propagate inside the sample "S" while being evanescent in the air. In this way, only the sample is exposed to the radiation leading to strong light-matter interaction and a corresponding surface modification 46. Tip exposure to radiation, on the other hand, is minimized compared to the situation in FIG. 19A.

FIG. 19C shows another embodiment where the probe-sample interaction occurs in a liquid. Tip 44 and the sample area of interest are surrounded by a liquid or fluid, "FL". As an example, the embodiment allows spectroscopy on biological specimens under native conditions or real-time observations of samples undergoing electrochemical reactions in a fluid cell. Since water absorption is minimized in the UV to near-infrared spectral region compared to the infrared region, water can be used as a liquid to study near-infrared absorption of biological matter in its native environment. In this case light induced photothermal expansion or retraction of the sample under the tip is observed and measured using PFT mode AFM operation, as discussed above. Other suitable liquids, e.g., heavy water, with no or minimal absorption in the wavelength range of interest may be used to extend the wavelength range. As another example, bottom illumination as described in FIG. 19A or 19B may be applied to minimize absorption of light transmitted through the liquid.

FIG. 19D illustrates an embodiment measuring the IR or visible absorption in a liquid environment with bottom illumination geometry with total internal reflection. The liquid environment can be water or another solvent. The total internal reflection of the light establishes an evanescent field that induces the light absorption from the IR mode or electronic transition of the sample within the evanescent field. The electronic transition can be in the ultraviolet, visible, or near-infrared. An example is fluorophore that is used in fluorescence microscopy. The absorption of electronic transition and subsequent non-radiative conversion leads to thermal effects or a pulse force in general with a mechanical response that is read out by the AFM probe using the PeakForce IR technique. Bottom illumination in this geometry minimizes the amount of light incident on the cantilever, reducing heating and hence background effects. In FIG. 19E bottom illumination is shown without using attenuated total internal reflection as shown in FIGS. 19B and 19D. A focusing element "FE", for example a lens, objective or off-axis parabolic mirror is used to focus the light "L" on the probe-sample interaction region that is immersed in liquid. Note that the light beam "L" can also come from the side and is bend by 90 degree (by reflective optics such as a mirror) to allow bottom illumination, giving a more compact design. Compared to FIG. 19D the approach in FIG. 19E does not need total internal reflection and hence does not need a prism where the sample is deposited. An opaque sample is sufficient or a piece of opaque material, e.g. ZnSe, where the sample is placed upon. Compared to FIG. 19C light "L" travels through less liquid and is hence absorbed less before interacting with the sample.

PFIR has an advantage in fluid based nanoscale IR absorption measurements where the probe/tip and the sample is surrounded by a liquid. Contact resonance exploited in PTIR is heavily damped in liquid environment and so are the free oscillations of the cantilever in AFM tapping mode used in PiFM. Hence, in prior art of PTIR and PiFM low performance is expected in liquid environment since both techniques rely solely on high-frequency cantilever oscillations that suffer from strong damping imposed by the surrounding medium. As described before, PFIR can use other properties than the heavily-damped contact resonance oscillation for extraction of the IR-related signals (such as IR absorption): for instance, the offset, or the slope representing changes in the mechanical properties (e.g. modulus or adhesion). Those properties are not influenced by a surrounding fluid and hence the IR signals deduced from them in PFIR should not suffer from damping in the liquid environment in contrast to the PTIR and PiFM techniques.

Figure 20:
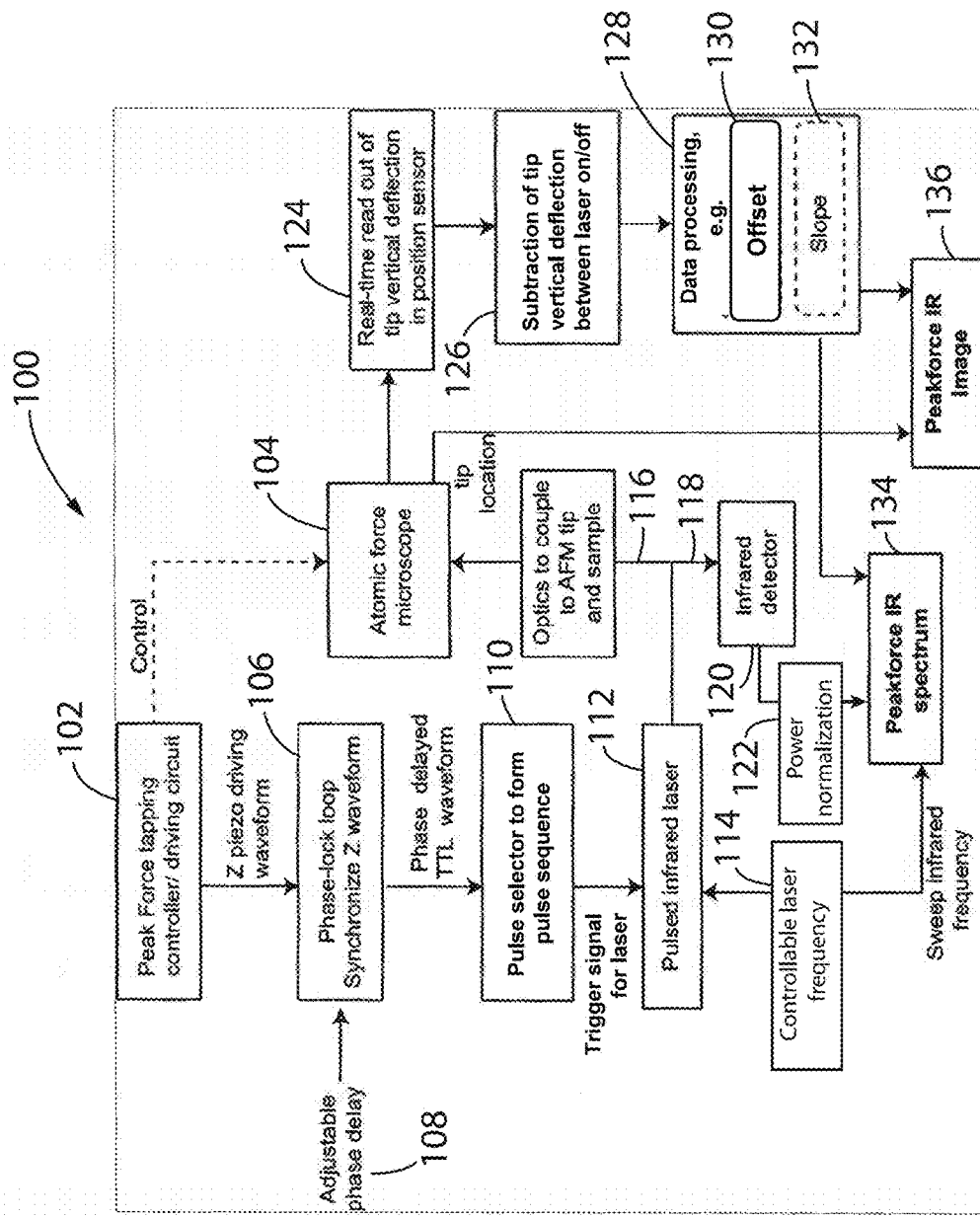
FIG. 20 is a block diagram of a Peak Force IR spectroscopy method using PFT mode AFM control, according to a preferred embodiment.

Turning to FIG. 20, a system 100 for performing a spectroscopy and mechanical property measurement is shown. System 100 will be described in conjunction with a corresponding method that first includes generating a voltage waveform with the AFM controller to control the piezo-scanner of AFM 104. In PFT mode, the voltage waveform of the z piezo (vertical) is simultaneously routed from the PFT controller 102 to a customized circuit that consists of a phase-lock loop (PLL block 106) that provides a TTL waveform output that is frequency and phase synchronized with the z-piezo waveform. The phase of the TTL waveform can be adjusted with an adjustable phase delay 108. The TTL waveform is then converted in a pulse selector 110 to generate a TTL waveform that, in one case, has one-half the frequency of the z-piezo driving frequency in PFT mode. The pulse selector receives an input sequence of pulses and delivers at its output a modified sequence of those pulses in the sense that certain pulses are absent. Since the output pulses drive the IR laser as trigger pulses, the pulse selector allows to choose a sequence of IR pulsed and IR un-pulsed interaction cycles. For instance, the pulse selector may provide one IR laser pulse for every probe-sample interaction cycle, or pulses to support a sequence of ten (10) IR pulsed probe-sample interaction cycles followed by one (1) cycle without IR laser illumination. Other sequences are possible. In another embodiment, the z-piezo movement frequency and phase in PFT is synchronized to the laser pulses, not the other way around as described above in this paragraph. In another implementation (FIGS. 14D and 14E) the IR laser output is not frequency and phase synchronized to the z piezo, but the IR laser is either emitting randomly distributed IR pulses in time, or the IR pulsing frequency is different from the PFT frequency. In that case IR pulsed probe-sample interaction cycles are analyzed individually to extract the IR signal associated with the surface pulse force.

The IR frequency or wavelength of the infrared laser is tuned by an external control 114. A portion 116 of the output of the pulsed infrared laser is coupled to an optical setup that couples and focuses the radiation to the apex of the tip of the atomic force microscope. Another portion 118 of the output of the pulsed infrared laser is measured by an infrared detector 120 to acquire the power for power normalization in Block 122. The laser pulse interacts with the sample and generates changes in tip motion. The real-time readout of the tip vertical deflection is done in a position sensor 124; in this case, a quadrant photodiode. A customized signal processing device 126 is used to subtract the tip vertical deflection signal between Peak Force tapping cycles, e.g., between two adjacent Peak Force tapping cycles (or selected ones of the cycles, "pulse picker/selector"), to obtain a trace difference (described further below). The deflection data corresponding to one of the cycles reflects pulsed laser radiation on the tip and sample, while the deflection data for the other cycle does not reflect laser radiation. The trace difference corresponds to the tip mechanical response induced by the laser acting on the sample. The signal is preferably averaged for a selected amount of Peak Force Tapping cycles to improve the signal-to-noise ratio.

Subsequent data processing is performed in Block 128 to obtain quantitative values from the trace difference. In the current embodiment, two types of data may be acquired: 1) the offset 130 in the deflection trace induced by the IR surface pulse force; and 2) the slope 132 of the trace difference that corresponds to the change of mechanical properties of the sample due to the interaction of the laser with the sample. Other signal extraction methods may be used, as described earlier, including the contact resonance oscillation, an increase in adhesion or a change in phase of the free cantilever oscillation after the probe-sample contact ended. Either one of the properties can be used to generate a Peakforce IR spectrum 134 or to perform Peakforce IR imaging 136. The Peakforce IR spectrum is obtained by sweeping the infrared frequency of the laser source and recording the output values of the analysis of the trace difference. The Peakforce IR image is formed by registering the lateral tip position (x-y) with the values from the data processing on the trace difference. Alternatively, another data extraction process is realized when element 126 is absent, i.e. a subtraction of traces of the IR pulsed and IR un-pulsed probe-sample interaction is not performed. Then the vertical deflection trace is directly processed. Furthermore, conventional normalization is used, i.e. at each wavelength the absorption is normalized to the power measured with the infrared detector 120. The laser power vs wavelength data can be obtained in parallel with the PFIR data or at a different time and can be saved for offline normalization. This procedure is necessary since the laser output power is not the same for each wavelength and atmospheric absorption, e.g. from water vapor, can reduce the transmitted laser power to the tip. It is understood that this method does not account for the wavelength-dependent change of IR laser spot size on the tip according to the diffraction limit. Unless correcting optics are present the spot size and hence the intensity at the tip change with wavelength which can be corrected for manually in the IR absorption when the wavelength-spot size relationship is known (which is generally a simple linear relation in diffraction limited optics).

In another embodiment the normalization is performed in a different way by using a reference sample that shows a non-zero PFIR response that is proportional to the laser intensity at the tip. It is preferred that this response is either constant, i.e. wavelength-independent, or shows a known wavelength-dependency. Such a sample could be doped Si or other semiconductors with a known free-carrier absorption profile in the IR, or a metal such as Au with a uniform, small wavelength-independent absorption in the IR. The IR absorption obtained with PFIR on the material of interest, e.g. a polymer or protein, would then be normalized by the PFIR absorption signal of the reference material. In yet another embodiment a specially designed tip may show a non-zero PFIR response itself which could be used for referencing to the laser power at the tip location. In that case the PFIR data obtained on the sample of interest, e.g. a polymer, would then be normalized by the PFIR data on a non-absorbing or uniformly absorbing sample such as undoped Si or Au. Since cantilevers and tips are commonly made out of Si, a tip providing a local measure of laser intensity for above normalization scheme may be made out of doped Si with its known free-carrier absorption, or could involve coating of the tip with an absorbing material layer. A nanoscale temperature sensor at the tip coupled to a uniformly absorbing IR material that serves as an absorber would also serve the purpose of measuring the local, wavelength-dependent IR laser intensity at the tip position.

In sum, the technique of peak force infrared (PFIR) microscopy enables simultaneous measurement of the local infrared absorption with the mechanical properties of modulus and adhesion with a spatial resolution of below 15 nanometers. Such multimodal nanoscale characterization capability with a simple experimental apparatus allows correlative investigations on how the chemical compositions are organized in nanomaterials and nanostructures. The method provides a spectroscopic sensitive and non-invasive surface characterization on the nanoscale in a wide range of research fields. This explicitly includes measurements in liquid environment.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method of performing spectroscopy using an atomic force microscope (AFM), the method comprising:
    causing a probe of the AFM to interact with the sample for multiple cycles, so as to produce a transient probe-sample interaction force, with an oscillating drive signal having a frequency below $f_o$, wherein $f_o$ is a resonance frequency of the probe;
    controlling the transient probe-sample interaction force;
    providing a pulsed light source to generate a pulse having a pulse width;
    directing the pulse at the sample where the probe is located causing an induced sample modification, wherein the pulse substantially coincides with the probe-sample contact time;
    measuring probe deflection due at least in part to the induced sample modification and determining, using the measured probe deflection, a response of the probe due to the induced sample modification;
    deriving at least one transient characteristic of the probe response; and
    providing a pulse selector which provides an un-pulsed interaction cycle for background subtraction with cycles of the drive signal so that the pulse interacts with the probe tip and sample every other cycle of probe-sample interaction.

2. The method of claim 1, wherein a wavelength of the light source ranges from ultraviolet to far IR.

3. The method of claim 2, wherein the wavelength is mid-IR.

4. The method of claim 1, wherein a transient probe-sample interaction time is at least 10 times longer than the pulse width.

5. The method of claim 4, further comprising synchronizing the pulse to the transient probe-sample interaction portion of the oscillation cycle of the oscillating drive signal.

6. The method of claim 5, further comprising synchronously averaging the probe response.

7. The method of claim 1, further comprising:
    collecting the at least one transient characteristic for different wave numbers of light pulses directed at the probe; and
    translating the probe relative to the sample and also performing all of the above steps of the method of claim 1 at each scan location.

8. A method of performing spectroscopy using an atomic force microscope (AFM), the method comprising:
    causing a probe of the AFM to interact with the sample for multiple cycles, so as to produce a transient probe-sample interaction force, with an oscillating drive signal having a frequency below $f_o$, wherein $f_o$ is a resonance frequency of the probe;
    controlling the transient probe-sample interaction force;
    providing a pulsed light source to generate a pulse having a pulse width;
    directing the pulse at the sample where the probe is located causing an induced sample modification, wherein the pulse substantially coincides with the probe-sample contact time;
    measuring probe deflection due at least in part to the induced sample modification and determining, using the measured probe deflection, a response of the probe due to the induced sample modification;
    deriving at least one transient characteristic of the probe response; and wherein the oscillating mode of AFM operation is a flexural mode of AFM operation in which the drive signal has a frequency $f_{flexure}$, and wherein the directing step includes directing pulses at the probe tip with a frequency $f_{pulse}$, and further comprising,
    synchronizing the pulses with cycles of drive signal so that the pulses are directed at the probe tip and sample during probe-sample interaction; and
    wherein the determining step includes discriminating the flexural response of the probe due to AFM control and the flexural response of the probe due to the IR induced sample modification.

9. The method of claim 8, wherein the discriminating step includes setting a frequency ($f_{flexure}$) of the drive signal to an integer number times a frequency ($f_{pulse}$) of the directing step and monitoring the amplitude of the flexural response.

10. The method of claim 8, wherein the discriminating step includes determining an offset between a baseline of the flexural oscillation with and without the induced sample modification.

11. The method of claim 10, wherein the offset is indicative of induced sample modification due to expansion or shrinkage of the surface after the directing the pulse at the sample step.

12. The method of claim 1, wherein a spatial resolution of the spectroscopy measurement is sub-20 nm.

13. The method of claim 1, wherein the controlling step includes operating the AFM in peak force tapping (PFT) mode.

14. The method of claim 1, further comprising using a time at which the directing step is performed in each cycle of the causing step as a reference to synchronously average multiple cycles of probe deflection.

15. The method of claim 1, further comprising providing a pulse selector which provides an un-pulsed interaction cycle for background subtraction with cycles of the drive signal so that the IR pulse interacts with the probe tip and sample every other cycle of probe-sample interaction; and
    detecting the deflection of the probe with a detector; and determining a flexural response of the probe due to the IR induced sample modification from the detected deflection.

16. A method of performing spectroscopy using an atomic force microscope (AFM), the method comprising:

causing a probe of the AFM to interact with the sample for multiple cycles, so as to produce a transient probe-sample interaction force, with an oscillating drive signal having a frequency at least 10× below $f_o$, wherein $f_o$ is a resonance frequency of the probe;

controlling the transient probe-sample interaction force;

providing a pulsed light source to generate a pulse having a pulse width;

directing the pulse at the sample where the probe is located causing an induced sample modification, wherein the pulse substantially coincides with the probe-sample contact time;

measuring probe deflection due at least in part to the induced sample modification and determining, using the measured probe deflection, a response of the probe due to the induced sample modification; and deriving at least one transient characteristic of the probe response.

\* \* \* \* \*